United States Patent
Lee et al.

(10) Patent No.: US 11,011,946 B2
(45) Date of Patent: May 18, 2021

(54) WIRELESS POWER TRANSMITTER AND WIRELESS POWER RECEIVER, AND OPERATION METHODS THEREFOR

(71) Applicant: Samsung Electronics Co., Ltd., Gyeonggi-do (KR)

(72) Inventors: Kyung-Woo Lee, Seoul (KR); Hee-Won Jung, Gyeonggi-do (KR); Sang-Wook Kwon, Gyeonggi-do (KR); Kang-Ho Byun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 153 days.

(21) Appl. No.: 16/317,672

(22) PCT Filed: Jul. 11, 2017

(86) PCT No.: PCT/KR2017/007380
§ 371 (c)(1),
(2) Date: Jan. 14, 2019

(87) PCT Pub. No.: WO2018/012838
PCT Pub. Date: Jan. 18, 2018

(65) Prior Publication Data
US 2019/0393735 A1 Dec. 26, 2019

(30) Foreign Application Priority Data

Jul. 12, 2016 (KR) .................. 10-2016-0087899

(51) Int. Cl.
*H02J 7/00* (2006.01)
*H02J 50/80* (2016.01)
(Continued)

(52) U.S. Cl.
CPC .............. *H02J 50/80* (2016.02); *H02J 7/025* (2013.01); *H02J 7/027* (2013.01); *H02J 50/12* (2016.02); *H04B 5/0037* (2013.01); *H02J 50/90* (2016.02)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

2009/0189458 A1* 7/2009 Kawasaki ............... H01F 38/14
307/104
2009/0243541 A1 10/2009 Jeong et al.
(Continued)

FOREIGN PATENT DOCUMENTS

EP 2 779 363 9/2014
EP 2 636 157 2/2016
(Continued)

OTHER PUBLICATIONS

European Search Report dated May 29, 2019 application No. 17827909,7-1202, 9 pages.
(Continued)

*Primary Examiner* — Arun C Williams
(74) *Attorney, Agent, or Firm* — The Farrell Law Firm, P.C.

(57) ABSTRACT

A method for controlling a wireless power transmitter for charging a wireless power receiver may comprise the operations of: transmitting power for charging; receiving a first PRU dynamic signal indicating completion of charging, from the wireless power receiver, applying a beacon for detecting the wireless power receiver on the basis of a load change to a resonance circuit of the wireless power transmitter; receiving, from the wireless power receiver, a first advertisement signal including information indicating that
(Continued)

charging is not requested; and ignoring the advertisement signal and maintaining application of the beacon.

15 Claims, 17 Drawing Sheets

(51) Int. Cl.
*H02J 50/12* (2016.01)
*H02J 7/02* (2016.01)
*H04B 5/00* (2006.01)
*H02J 50/90* (2016.01)

(56) References Cited

U.S. PATENT DOCUMENTS

| | | | |
|---|---|---|---|
| 2012/0249051 A1 | 10/2012 | Son et al. | |
| 2013/0002038 A1 | 1/2013 | Lee et al. | |
| 2013/0278212 A1* | 10/2013 | Kai | B60L 53/126 |
| | | | 320/108 |
| 2014/0028093 A1* | 1/2014 | Aikawa | H04B 5/0037 |
| | | | 307/11 |
| 2014/0145516 A1* | 5/2014 | Hirosawa | H02J 7/00712 |
| | | | 307/104 |
| 2014/0285143 A1 | 9/2014 | Kwon et al. | |
| 2014/0292267 A1 | 10/2014 | Ahn | |
| 2014/0361738 A1 | 12/2014 | Lee et al. | |
| 2016/0094083 A1 | 3/2016 | Park et al. | |
| 2016/0380470 A1 | 12/2016 | Son et al. | |

FOREIGN PATENT DOCUMENTS

| | | |
|---|---|---|
| EP | 2 988 392 | 2/2016 |
| KR | 1020090103749 | 10/2009 |
| KR | 1020120110935 | 10/2012 |
| KR | 1020140115898 | 10/2014 |
| KR | 1020140143104 | 12/2014 |
| KR | 1020150117835 | 10/2015 |
| WO | WO 2012/058724 | 5/2012 |
| WO | WO 2013/089519 | 6/2013 |
| WO | WO 2014/057343 | 4/2014 |

OTHER PUBLICATIONS

PCT/ISA/210 Search Report issued on PCT/KR2017/007380 (pp. 5).
PCT/ISA/237 Written Opinion issued on PCT/KR2017/007380 (pp. 7).
Indian Examination Report dated Jan. 27, 2021 issued in counterpart application No. 201947005086, 5 pages.
European Search Report dated Feb. 10, 2021 issued in counterpart application No. 17827909.7-1202, 6 pages.

* cited by examiner

WIRELESS POWER TRANSMITTER AND WIRELESS POWER RECEIVER, AND OPERATION METHODS THEREFOR

PRIORITY

This application is a National Phase Entry of International Application No. PCT/KR2017/007380, which was filed on Jul. 11, 2017, and claims priority to Korean Patent Application No. 10-2016-0087899, which was filed on Jul. 12, 2016, the content of each of which is incorporated herein by reference.

BACKGROUND

1. Field

The present disclosure generally relates to a wireless power transmitter, a wireless power receiver, and an operation method thereof and, more particularly, to a wireless power transmitter, a wireless power receiver, and an operation method thereof, which are capable of performing communication using a predetermined scheme.

2. Description of the Related Art

Mobile terminals such as mobile phones, personal digital assistants (PDA), and the like are driven using rechargeable batteries due to nature of mobile terminals, and the battery of mobile terminals is supplied with electronic energy using a separate charging device. Generally, the charging device and the battery may have separate contact terminals respectively installed in their exteriors, and when the contact terminals meet, the charging device and the battery may be electrically connected.

However, in such a contact-type charging scheme, the contact terminals protrude outwardly, and thus are easily contaminated by rogue objects. As a result, battery charging is not properly performed. Further, battery charging may also be improperly performed when the contact terminal is exposed to moisture.

Recently, wireless charging or non-contact charging technology has been developed and used for electronic devices to solve the above-mentioned problems.

Wireless charging technology uses wireless power transmission and reception, and corresponds to, for example, a system in which a battery is automatically charged if the battery is put on a charging pad without connecting the mobile phone to a separate charging connector. Generally, the technology is known to people via a wireless electric toothbrush, a wireless electric shaver, or the like. This wireless charging technology can improve waterproof functions because it can be used to wirelessly charge the electronic devices. Furthermore, this wireless charging technology can improve the portability of the electronic devices because it does not require a wired charger. Therefore, it is expected that technologies related to this wireless charging technology will be significantly developed in the coming age of electric cars.

The wireless charging technology largely includes an electromagnetic induction scheme using a coil, a resonance scheme using resonance, and an RF/microwave radiation scheme that converts electrical energy into a microwave and then transmits the microwave.

It has been considered up until now that the electromagnetic induction scheme is mainstream, but it is expected that the day will come in the near future when all electronic products are wirelessly charged, anytime and anywhere, without a wire, on the strength of recent successful experiments at home and abroad on wireless power transmission over dozens of meters using microwaves.

A power transmission method based on the electromagnetic induction corresponds to a scheme of transmitting power between a first coil and a second coil. When a magnet is moved in a coil, an induction current occurs. By using the induction current, a magnetic field is generated at a transmitting end, and an electric current is induced according to the change in the magnetic field so as to generate energy at the receiving end. This phenomenon is referred to as magnetic induction, and the power transmission method using magnetic induction has high energy transmission efficiency.

With respect to the resonance scheme, Prof. Soljacic of MIT announced a system in which electricity is wirelessly transferred using a power transmission principle of the resonance scheme based on a coupled mode theory even if a device to be charged is separated from a charging device by several meters. The wireless charging system of the MIT team employs the concept of resonance in physics, which describes the phenomenon in which when a tuning fork oscillates at a particular frequency, a wine glass, for example, next to the tuning fork oscillates at the same frequency. The research team has made an electromagnetic wave containing electrical energy resonate instead of making sounds resonate. It is known that the resonant electrical energy does not affect surrounding machines or human bodies differently from other electromagnetic waves because the resonant electrical energy is directly transferred only to a device that has a resonance frequency and unused parts are reabsorbed into an electromagnetic field instead of spreading into the air.

SUMMARY

In association with a resonance scheme, the A4WP standard has been published. The A4WP standard discloses a procedure performed when a wireless power receiver completes charging. When charging is completed, the wireless power receiver may transmit a signal indicating the completion of charging to a wireless power transmitter, and the wireless power transmitter may stop charging. Subsequently, the wireless power transmitter may need to enter a power save mode, and needs to perform a charging related procedure again with the wireless power receiver that completes charging, which is a drawback.

The present disclosure has been made in order to overcome the above-described drawback. The wireless power transmitter, the wireless power receiver, and the operation method thereof, according to various embodiments of the present disclosure, provide a configuration in which a charging-related procedure is not performed again after charging is completed.

In accordance with an aspect of the present disclosure, a control method of a wireless power transmitter for charging a wireless power receiver is provided. The method may include: transmitting power for charging; receiving a first PRU dynamic signal indicating completion of charging from the wireless power receiver; applying, to a resonant circuit of the wireless power transmitter, a beacon for detecting the wireless power receiver on the basis of a load change; receiving a first advertisement signal including information indicating that charging is not requested from the wireless power receiver; and disregarding the advertisement signal and maintaining the application of the beacon.

In accordance with an aspect of the present disclosure, a wireless power transmitter for charging a wireless power receiver is provided. The wireless power transmitter may include: a resonant circuit configured to transmit power for charging; a communication unit configured to receive a first PRU dynamic signal indicating completion of charging from the wireless power receiver; and a controller, wherein the controller is configured to perform controls so as to: apply, to the resonant circuit, a beacon for detecting the wireless power receiver on the basis of a load change; and when a first advertisement signal including information indicating that charging is not requested is received by the communication unit from the wireless power receiver, disregard the advertisement signal and maintain the application of the beacon.

In accordance with an aspect of the present disclosure, a control method of a wireless power receiver for receiving power from a wireless power transmitter is provided. The method may include: receiving power for charging; detecting completion of charging; transmitting a first PRU dynamic signal indicating completion of charging to the wireless power receiver, receiving a charging function control signal that disables a charging function from the wireless power transmitter; and transmitting a first advertisement signal including information indicating that charging is not requested to the wireless power transmitter.

In accordance with an aspect of the present disclosure, a wireless power receiver for receiving power from a wireless power transmitter is provided. The wireless power receiver may include: a resonant circuit configured to receive power for charging; a controller configured to detect completion of charging; and a communication unit configured to transmit a first PRU dynamic signal indicating completion of charging to the wireless power receiver, to receive a charging function control signal that disables a charging function from the wireless power transmitter, and to transmit a first advertisement signal including information indicating that charging is not requested to the wireless power transmitter.

According to various embodiments, there is provided a configuration in which a charging related procedure is not performed again after charging is completed. Accordingly, another charging procedure is prevented from being performed and thus, unnecessary resource waste and power waste may be prevented.

DETAILED DESCRIPTION

Figure 1:
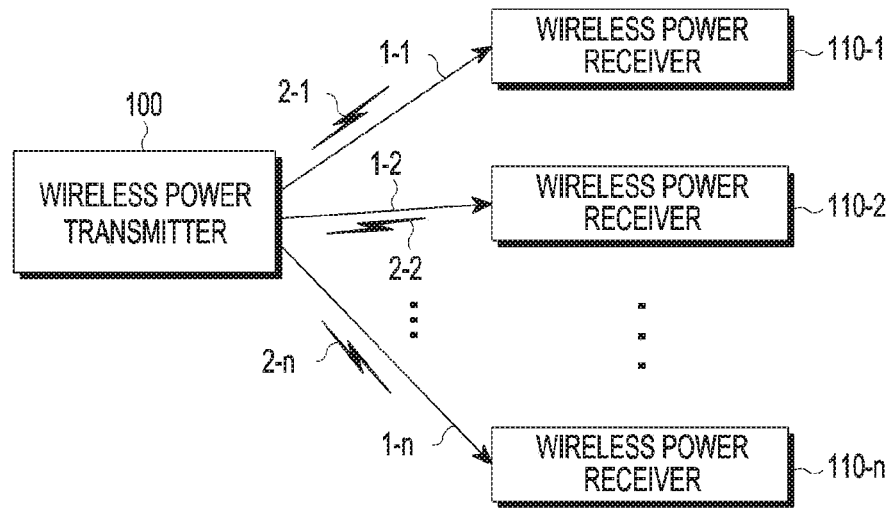
FIG. 1 is a conceptual diagram illustrating overall operations of a wireless charging system.

Hereinafter, various embodiments of the present disclosure will be described more specifically with reference to the accompanying drawings. It should be noted that the same components of the drawings are designated by the same reference numeral everywhere. In the following description of the present disclosure, a detailed description of known functions and configurations incorporated herein will be omitted when it may make the subject matter of the present disclosure rather unclear.

The concept of a wireless charging system that is applicable to embodiments of the present disclosure will be described preferentially with reference to FIGS. 1 to 11, and then a wireless power transmitter, according to various embodiments of the present disclosure, will be described in detail with reference to FIGS. 12 to 19.

FIG. 1 is a conceptual diagram illustrating the overall operations of a wireless charging system. As shown in FIG. 1, a wireless charging system includes a wireless power transmitter 100 and at least one wireless power receiver 110-1, 110-2, . . . , and 110-$n$.

The wireless power transmitter 100 may wirelessly transmit power 1-1, 1-2, . . . , and 1-$n$ to the at least one wireless power receiver 110-1, 110-2, . . . , and 110-$n$, respectively. Particularly, the wireless power transmitter 100 may wirelessly transmit power 1-1, 1-2, . . . , and 1-$n$ to only a wireless power receiver which is authenticated via a predetermined authentication procedure.

The wireless power transmitter 100 may achieve an electrical connection with the wireless power receivers 110-1, 110-2, . . . , and 110-n. For example, the wireless power transmitter 100 may transmit wireless power in the form of electromagnetic waves to the wireless power receivers 110-1, 110-2, . . . , and 110-n.

The wireless power transmitter 100 may perform bidirectional communication with the wireless power receivers 110-1, 110-2, . . . , and 110-n. Here, the wireless power transmitter 100 and the wireless power receivers 110-1, 110-2, . . . , and 110-n may process packets 2-1, 2-2, . . . , and 2-n including a predetermined number of frames, or transmit and receive the packets. The frames will be described below in more detail. Particularly, the wireless power receiver may be implemented as a mobile communication terminal, a PDA, a PMP, a smartphone, or the like.

The wireless power transmitter 100 may wirelessly provide power to a plurality of wireless power receivers 110-1, 110-2, . . . , and 110-n. For example, the wireless power transmitter 100 may transmit power to the plurality of wireless power receivers 110-1, 110-2, . . . , and 110-n via a resonance scheme. When the wireless power transmitter 100 adopts the resonance scheme, it is preferable that the distance between the wireless power transmitter 100 and the plurality of wireless power receivers 110-1, 110-2, . . . , and 110-n be less than or equal to 30 m. Further, when the wireless power transmitter 100 adopts the electromagnetic induction scheme, it is preferable that the distance between the wireless power transmitter 100 and the plurality of wireless power receivers 110-1, 110-2, . . . , and 110-n be less than or equal to 10 cm.

The wireless power receivers 110-1, 110-2, . . . , and 110-n may receive wireless power from the wireless power transmitter 100 to charge batteries therein. Further, the wireless power receivers 110-1, 110-2, . . . , and 110-n may transmit a signal to request wireless power transmission, information necessary for receiving wireless power, status information of the wireless power receivers, or control information of the wireless power transmitter 100 to the wireless power transmitter 100. Information on the transmitted signal will be described below in more detail.

Further, each of the wireless power receivers 110-1, 110-2, . . . , and 110-n may transmit a message indicating its charging status to the wireless power transmitter 100.

The wireless power transmitter 100 may include a display unit such as a display, and may display the Status of each of the wireless power receivers 110-1, 110-2, and 110-n on the basis of the message received from each of the wireless power receivers 110-1, 110-2, . . . , and 110-n. Also, the wireless power transmitter 100 may display the expected time period until charging each of the wireless power receivers 110-1, 110-2 and 1110-n is completed, together.

The wireless power transmitter 100 may transmit a control signal that disables the wireless charging function to each of the wireless power receivers 110-1, 110-2, . . . , and 110-n. The wireless power receivers, having received the control signal that disables the wireless charging function from the wireless power transmitter 100, may disable the wireless charging function.

Figure 2:
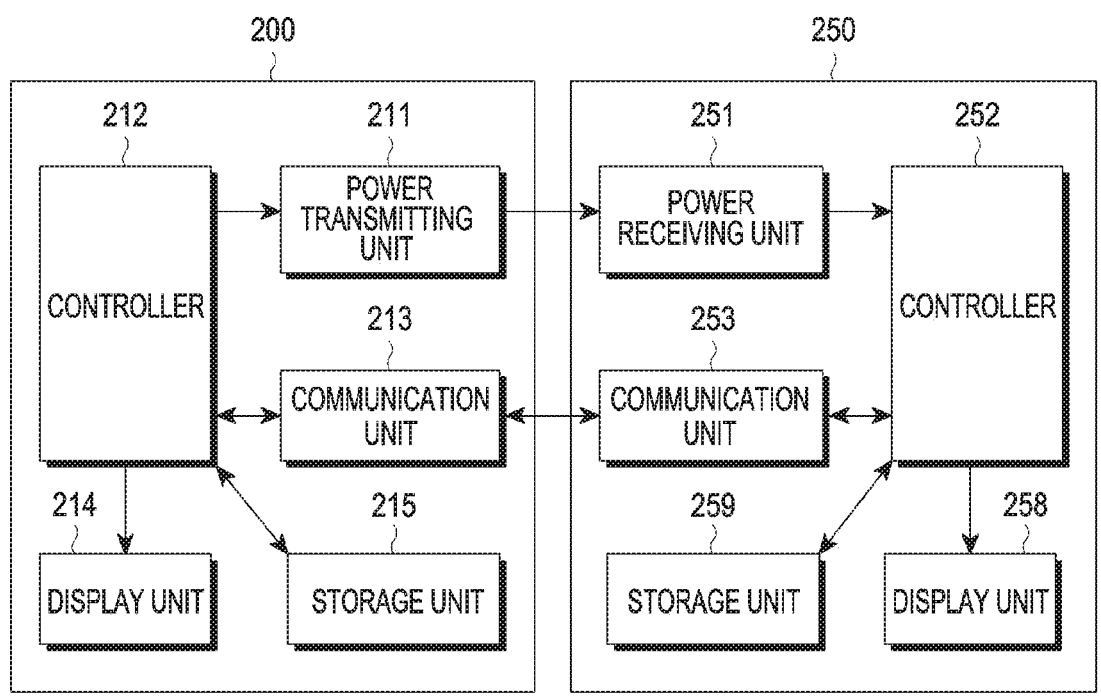
FIG. 2 is a diagram illustrating wireless power transmitter and a wireless power receiver according to an embodiment of the present disclosure.

FIG. 2 illustrates a wireless power transmitter and a wireless power receiver according to an embodiment of the present disclosure.

As illustrated in FIG. 2, a wireless power transmitter 200 may include a power transmitting unit 211, a controller 212, a communication unit 213, a display unit 214, and a storage unit 215.

The power transmitting unit 211 may provide the power required by the wireless power transmitter 200, and may provide power to the wireless power receiver 250 in a wireless manner. The power transmitting unit 211 may supply power in the alternating-current (AC) waveform, or convert the power in the direct-current (DC) waveform into the power in the AC waveform using an inverter and supply the power in the AC waveform. The power transmitting unit 211 may be implemented in the form of an embedded battery or in the form of a power reception interface so as to receive power from the outside and supply power to other elements. It will be easily understood by those skilled in the art that there is no limitation on the power transmitting unit 211 if it is a unit that can supply power in the AC waveform.

The controller 212 may control the overall operations of the wireless power transmitter 200. The controller 212 may control the overall operations of the wireless power transmitter 200 using an algorithm, a program, or an application which is required for control read from a storage unit 215. The controller 212 may be implemented in the form of a central processing unit (CPU), a microprocessor, or a mini computer. Accordingly, the controller 212 may be named a controller or a micro controlling unit (MCU) depending on the implementation.

The communication unit 213 may communicate with the wireless power receiver 250 according to a predetermined scheme. The communication unit 213 may receive power information from the wireless power receiver 250. Here, the power information may include at least one of the capacity of the wireless power receiver 250, the amount of charge remaining in the battery, the number of times that charging is performed, the amount of usage, battery capacity, and battery percentage.

Further, the communication unit 213 may transmit a charging function control signal that controls the charging function of the wireless power receiver 250. The charging function control signal may be a control signal that controls the power receiving unit 251 of the predetermined wireless power receiver 250 so as to enable or disable the charging function. Alternatively, the power information may include information associated with the insertion of a wired charging terminal, switching from a standalone (SA) mode to a non standalone (NSA) mode, error status release, and the like, which will be described in detail below. Also, the charging function control signal may be information associated with the identification of cross connection according to various embodiments of the present disclosure. For example, the charging function control signal may include identification information, setup information, and the like which are used for identifying the cross connection, and may include pattern or time information associated with a change in the load of the wireless power receiver 250 which is used for identifying the cross connection.

The communication unit 213 may receive a signal from another wireless power transmitter (not shown), in addition to receiving from the wireless power receiver 250.

The controller 212 may display the status of the wireless power receiver 250 on the display unit 214 on the basis of a message received from the wireless power receiver 250 via the communication unit 213. Also, the controller 212 may display, on the display unit 214, the amount of time expected to be spent until the wireless power receiver 250 is completely charged.

Also, as illustrated in FIG. 2, the wireless power receiver 250 may include at least one from among a power receiving unit 251, a controller 252, a communication unit 253, a display unit 258, and a storage unit 259.

The power receiving unit 251 may wirelessly receive power transmitted from the wireless power transmitter 200. Here, the power receiving unit 251 may receive power in the AC waveform.

The controller 252 may control the overall operations of the wireless power receiver 250. The controller 252 may control the overall operations of the wireless power transmitter 250 using an algorithm, a program, or an application which is required for control read from the storage unit 259. The controller 252 may be implemented in the form of a CPU, a microprocessor, or a mini computer.

The communication unit 253 may communicate with the wireless power transmitter 200 according to a predetermined scheme. The communication unit 253 may transmit power information to the wireless power transmitter 200. Here, the power information may include at least one of the capacity of the wireless power receiver 250, the amount of charge remaining in the battery, the number of times that charging is performed, the amount of usage, battery capacity, and battery percentage.

Further, the communication unit 253 may transmit a charging function control signal that controls the charging function of the wireless power receiver 250. The charging function control signal may be a control signal that controls the power receiving unit 251 of the predetermined wireless power receiver 250 so as to enable or disable the charging function. Alternatively, power information may include information associated with the insertion of a wired charging terminal, switching from a standalone (SA) mode to a non standalone (NSA) mode, error status release, and the like, which will be described in detail below. Also, the charging function control signal may be information associated with the identification of cross connection according to various embodiments of the present disclosure. For example, the charging function control signal may include identification information, setup information, and the like which are used for identifying a cross connection, and may include pattern or time information associated with a change in the load of the wireless power receiver 250 used for identifying the cross connection.

The controller 252 may perform a control such that the status of the wireless power receiver 250 is displayed on the display unit 258. Further, the controller 252 may also display, on the display unit 258, the amount of time expected to be spent until the wireless power receiver 250 is completely charged.

Figure 3:
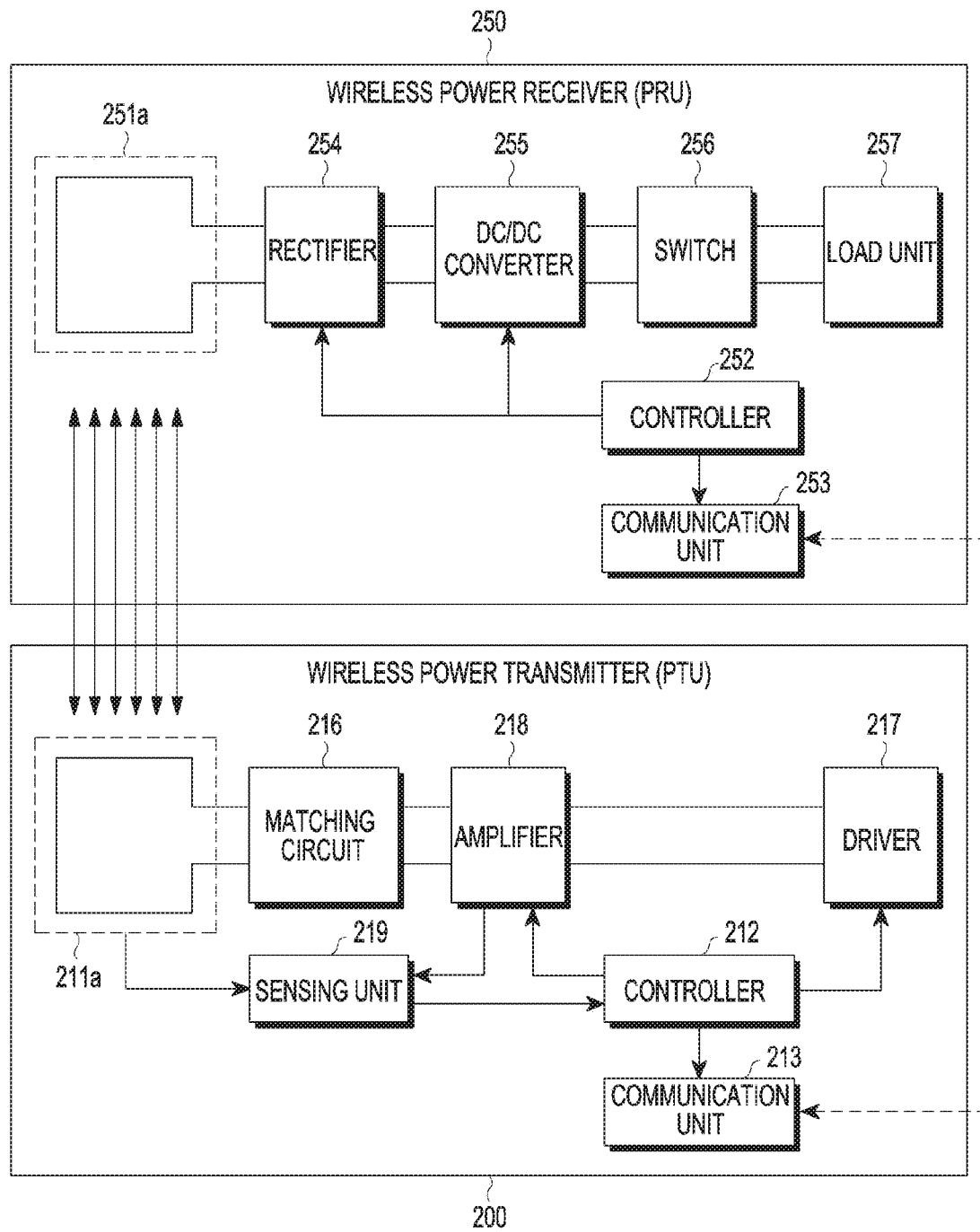
FIG. 3 is a detailed block diagram illustrating a wireless power transmitter and the wireless power receiver according to an embodiment of the present disclosure.

FIG. 3 is a detailed block diagram illustrating a wireless power transmitter and a wireless power receiver according to an embodiment of the present disclosure.

As illustrated in FIG. 3, the wireless power transmitter 200 may include at least one from among a transmission side resonator (Tx resonator) 211a, the controller 212 (e.g., MCU), the communication unit 213 (e.g., an out-of-band signaling unit), a driver (power supply) 217, an amplifier (power amp) 218, a matching circuit 216, and a sensing unit 219. The wireless power receiver 250 may include at least one from among a reception side resonator (Rx resonator) 251a, the controller 252, the communication unit 253, a rectifier 254, a DC/DC converter 255, a switch 256, and a load unit (client device load) 257.

The driver 217 may output DC power having a predetermined voltage value. The voltage value of the DC power output from the driver 217 may be controlled by the controller 212.

The direct current output from the driver 217 may be output to the amplifier 218. The amplifier 218 may amplify the direct current by a predetermined gain. Further, the DC power may be converted into AC power on the basis of a signal input from the controller 212. Accordingly, the amplifier 218 may output AC power.

The matching circuit 216 may perform impedance matching. For example, the output power may be controlled to have high efficiency or high capacity by adjusting impedance viewed from the matching circuit 216. The sensing unit 219 may sense a load change made by the wireless power receiver 250, via the Tx resonator 211a or the amplifier 218. The sensing result of the sensing unit 219 may be provided to the controller 212.

The matching circuit 216 may adjust the impedance according to the control of the controller 212. The matching circuit 216 may include at least one of a coil and a capacitor. The controller 212 may control a connection status with at least one of the coil and the capacitor and, accordingly, perform impedance matching.

The Tx resonator 211a may transmit the input AC power to the Rx resonator 251a. The Tx resonator 211a and the Rx resonator 251a may be implemented as resonant circuits having the same resonant frequency. For example, the resonant frequency may be determined to be 6.78 MHz. According to an embodiment, an inverter unit (not illustrated) may invert DC power from the driver 217 into AC power, and may output the same to the Tx resonator 211a.

The communication unit 213 may communicate with the communication unit 253 of the wireless power receiver 250, and may perform bi-directional communication (Wi-Fi, ZigBee, or BT/BLE) at, for example, a 2.4 GHz frequency.

The Rx resonator 251a may receive power for charging.

The rectifier 254 may rectify wireless power received by the Rx resonator 651 in the DC form, and, for example, may be implemented in the form of a bridge diode. The DC/DC converter 255 may convert the rectified electric current on the basis of a predetermined gain. For example, the DC/DC conversion unit 255 may convert the rectified power such that the voltage of the output side has 5V. The minimum value and the maximum value of the voltage that may be applied to the front end of the DC/DC converter 255 may be set in advance.

The switch 256 may connect the DC/DC converter 256 to the load unit 257. The switch 256 may maintain the On/Off status under the control of the controller 252. The switch 256 may be omitted. In the case where the switch 256 is in the On status, the load unit 257 may store converted power which is input from the DC/DC converter 255.

Figure 4:
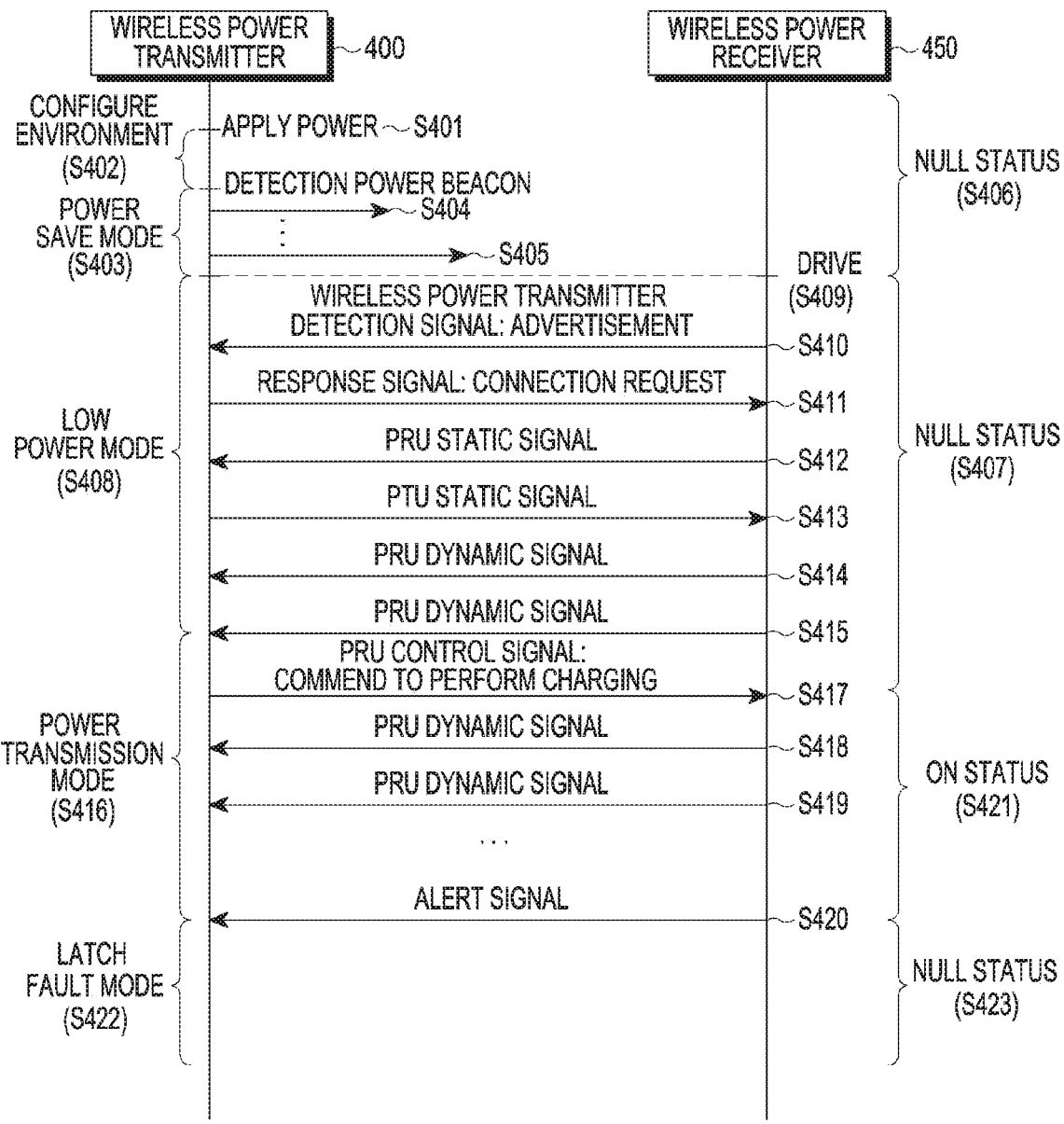
FIG. 4 is a flowchart illustrating operations of a wireless power transmitter and a wireless power receiver according to an embodiment of the present disclosure.

FIG. 4 is a flowchart illustrating operations of a wireless power transmitter and a wireless power receiver according to an embodiment of the present disclosure. As shown in FIG. 4, a wireless power transmitter 400 may apply power in operation S401. When the power is applied, the wireless power transmitter 400 may configure an environment in operation S402.

The wireless power transmitter 400 may enter a power save mode in operation S403. In the power save mode, the wireless power transmitter 400 may apply different types of detection power beacons at their regular intervals, which will be described in detail with reference to FIG. 6. For example, as shown in FIG. 4, the wireless power transmitter 400 may apply detection power beacons S404 and S405 (e.g., a short beacon or a long beacon), and the power values of the detection power beacons S404 and S405 may be different from each other. Some or all of the detection power beacons S404 and S405 may have power, the amount of which is enough to drive the communication unit of a wireless power receiver 450. For example, the wireless power receiver 450 may drive the communication unit by some or all of the detection power beacons S404 and S405, and may communicate with the wireless power transmitter 400. In this instance, the status may be referred to as null status S406.

The wireless power transmitter 400 may detect a load change by the disposition of the wireless power receiver 450. The wireless power transmitter 400 may enter a low power mode S408. The low power mode will be described in more detail with reference to FIG. 6. The wireless power receiver 450 may drive the communication unit on the basis of power received from the wireless power transmitter 400 in operation S409.

The wireless power receiver 450 may transmit a wireless power transmitter search signal (i.e., PTU searching) to the wireless power transmitter 400 in operation S410. The wireless power receiver 450 may transmit the wireless power transmitter search signal using a BLE based advertisement (AD) signal. The wireless power receiver 450 may transmit the wireless power transmitter search signal periodically or until a response signal is received from the wireless power transmitter 400 or a predetermined time elapses.

When a wireless power transmitter search signal is received from the wireless power receiver 450, the wireless power transmitter 400 may transmit a response signal (PRU response), which may be a connection request signal, in operation S411. Here, the response signal may form a connection between the wireless power transmitter 400 and the wireless power receiver 450.

The wireless power receiver 450 may transmit a PRU static signal in operation S412. Here, the PRU static signal may be a signal indicating the status of the wireless power receiver 450, and may be used to request subscription to the wireless power network managed by the wireless power transmitter 400.

The wireless power transmitter 400 may transmit a PTU static signal in operation S413. The PTU static signal that the wireless power transmitter 400 transmits may be a signal indicating the capability of the wireless power transmitter 400.

When the wireless power transmitter 400 and the wireless power receiver 450 transmit and receive a PRU static signal and a PTU static signal, the wireless power receiver 450 may periodically transmit a PRU dynamic signal in operations S414 and S415. The PRU dynamic signal may include information on at least one parameter measured by the wireless power receiver 450. For example, the PRU dynamic signal may include information on the voltage at the back end of the rectifier of the wireless power receiver 450. The status of the wireless power receiver 450 may be referred to as a boot status S427.

The wireless power transmitter 400 may enter a power transmission mode in operation S416, and the wireless power transmitter 400 may transmit a PRU control signal which commands the wireless power receiver 450 to perform charging in operation S417. In the power transmission mode, the wireless power transmitter 400 may transmit charging power. In response to receiving the PRU control signal, the wireless power receiver 450 may initiate charging, and may enter the On status S421.

The PRU control signal transmitted by the wireless power transmitter 400 may include information that enables/disables charging of the wireless power receiver 450 and permission information. The PRU control signal may be transmitted whenever a charging status is changed. The PRU control signal may be transmitted, for example, every 250 ms, or transmitted when a parameter is changed. The PRU control signal may be set to be transmitted within a predetermined threshold time, for example, within one second even though the parameter is not changed.

The wireless power receiver 400 may change the configuration according to the PRU control signal and may transmit a PRU dynamic signal for reporting the status of the wireless power receiver 450 in operations S418 and S419. The PRU dynamic signal transmitted by the wireless power receiver 450 may include at least one of information on the voltage, the current, the status of the wireless power receiver, and temperature. The status of the wireless power receiver 450 may be called the On status.

The PRU dynamic signal may have a data structure as indicated in Table 1.

TABLE 1

| Field | octets | description | use | units |
|---|---|---|---|---|
| optional fields | 1 | defines which optional fields are populated | mandatory | |
| Vrect | 2 | DC voltage at the output of the rectifier | mandatory | mV |
| Irect | 2 | DC current at the output of the rectifier | mandatory | mA |
| Iout | 2 | voltage at charge battery port | optional | mV |
| Vout | 2 | Current at charge battery port | optional | mA |
| temperature | 1 | Temperature of PRU | optional | Deg C. from −40° C. |
| Vrect min dyn | 2 | The current dynamic minimum rectifier voltage desired | optional | mV |
| Vrect set dyn | 2 | Desired Vrect (dynamic value) | optional | mV |
| Vrect high dyn | 2 | The current dynamic maximum rectifier voltage desired | optional | mV |
| PRU alert | 1 | warnings | mandatory | Bit field |
| RFU | 3 | undefined | | |

As shown in Table 1, the PRU dynamic signal may include at least one field. In the fields, optional field information, voltage information of the back end of a rectifier of a wireless power receiver, current information of the back end of the rectifier of the wireless power receiver, voltage information of the back end of a DC/DC converter of the wireless power receiver, current information of the back end of the DC/DC converter of the wireless power receiver, temperature information, minimum voltage value information (VRECT_MIN_DYN) of the back end of the rectifier of the wireless power receiver, optimum voltage value information (VRECT_SET_DYN) of the back end of the rectifier of the wireless power receiver, maximum voltage value information (VRECT_HIGH_DYN) of the back end of the rectifier of the wireless power receiver, alert information (PRU alert), and the like may be set. The PRU dynamic signal may include at least one of the above fields.

For example, at least one voltage set value (e.g., the minimum voltage value information (VRECT_MIN_DYN) of the back end of the rectifier of the wireless power receiver, the optimal voltage value information (VRECT_SET_DYN) of the back end of the rectifier of the wireless power receiver, and the maximum voltage value information (VRECT_HIGH_DYN) of the back end of the rectifier of the wireless power receiver) determined according to charging status may be inserted into corresponding fields and then transmitted. As described above, the wireless power transmitter that receives the PRU dynamic signal may adjust a wireless charging voltage to be transmitted to each wireless power receiver on the basis of the voltage set values included in the PRU dynamic signal.

Among them, the alert information (PRU Alert) may have a data structure shown in Table 2 below.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | Restart request | RFU |

Referring to Table 2, the alert information (PRU Alert) may include a bit for a restart request, a bit for transition, and a bit for detecting the insertion of a travel adapter (TA) (TA detect). The TA detect indicates a bit informing of the connection between the wireless power transmitter providing wireless charging and a terminal for wired charging, by the wireless power receiver. The bit for transition indicates a bit informing the wireless power transmitter that the wireless power receiver is reset before the communication integrated circuit (IC) of the wireless power receiver is switched from a standalone (SA) mode to a non standalone (NSA) mode. Lastly, the restart request indicates a bit informing the wireless power receiver that the wireless power transmitter is ready to restart charging when charging is disconnected since the wireless power transmitter reduces power due to an over current status or an over temperature status, and then the status is returned to the normal status.

Further, the alert information (PRU Alert) may also have a data structure shown in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Change Complete | Wired Charger Detect | Mode Transition Bit 1 | Mode Transition Bit 0 |

Referring to Table 3 above, the alert information may include over voltage, over current, over temperature, wireless power receiver self protection (PRU self protection), charge compete, wired charger detect, mode transition and the like. Here, the fact that an over voltage field is set to "1" indicates that the voltage Vrect of the wireless power receiver exceeds an over voltage limit. Further, the over current and the over temperature may be set in the same manner as the over voltage. The PRU self protection indicates that the wireless power receiver directly reduces a load of power and thus protects itself. In this event, the wireless power transmitter does not need to change the charging status.

Bits for mode transition according to an embodiment of the present disclosure may be set as a value informing the wireless power transmitter of a period during which a mode transition procedure is performed. The bits indicating the mode transition period may be expressed as shown in Table 4 below.

TABLE 4

| Vlaue (Bit) | Mode Transition Bit Description |
|---|---|
| 00 | No Mode Transition |
| 01 | 2s Mode Transition time limit |
| 10 | 3s Mode Transition time limit |
| 11 | 6s Mode Transition time limit |

With reference to Table 4, "00" indicates no mode transition. "01" indicates that the amount of time needed to complete mode transition is a maximum of 2 seconds. "10" indicates that the amount of time needed to complete mode transition is a maximum of 3 seconds. "11" indicates that the amount of time needed to complete mode transition is a maximum of 6 seconds.

For example, when three seconds or less are spent on completing the mode transition, the mode transition bit may be set to "10". Prior to starting the mode transition procedure, the wireless power receiver may put a restriction such that there is no change in impedance during the mode transition procedure by changing an input impedance setting to match 1.1 W power draw. Accordingly, the wireless power transmitter may control power (ITX_COIL) for the wireless power receiver in accordance with the setting, and accordingly, may maintain the power (ITX_COIL) for the wireless power receiver during the mode transition period.

Accordingly, when the mode transition period is set by the mode transition bit, the wireless power transmitter may maintain the power (ITX_COIL) for the wireless power receiver during the mode transition time, for example, three seconds. That is, although a response is not received from the wireless power receiver, the wireless power transmitter may maintain a connection for three minutes. However, after the mode transition time elapses, the wireless power receiver may be considered as a rogue object and thus power transmission may be terminated.

The wireless power receiver 450 may detect the occurrence of errors. The wireless power receiver 450 may transmit an alert signal to the wireless power transmitter 400 in operation S420. The alert signal may be transmitted in the form of a PRU dynamic signal or an alert signal. For example, the wireless power receiver 450 may include an error status in the PRU alert field of Table 1, and may transmit the same to the wireless power transmitter 400. Alternatively, the wireless power receiver 450 may transmit a single alert signal indicating the error status to the wireless power transmitter 400. When receiving the alert signal, the wireless power transmitter 400 may enter a latch fault mode in operation S422. The wireless power receiver 450 may enter a null status in operation S423.

Figure 5:
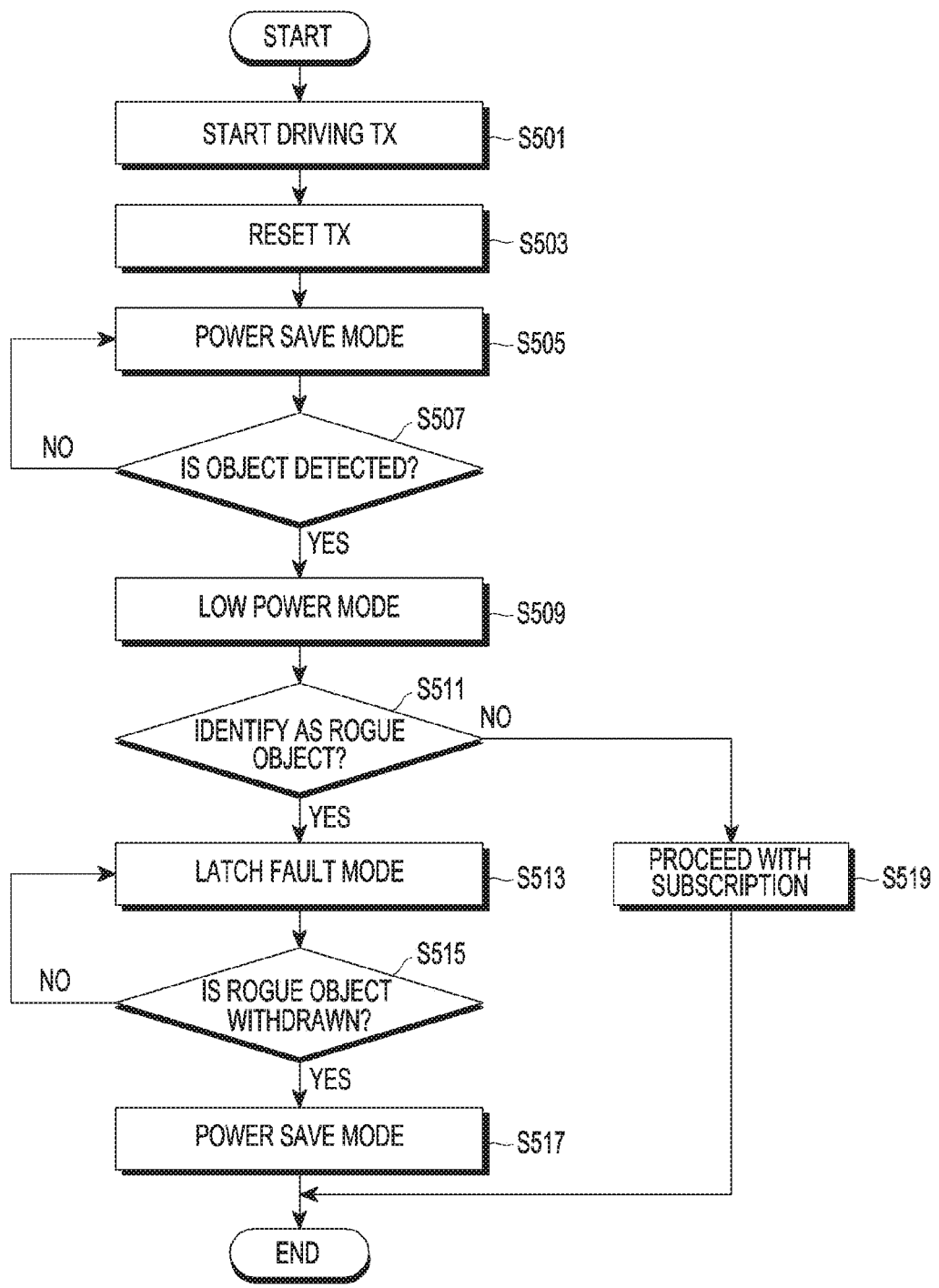
FIG. 5 is a flowchart illustrating operations of a wireless power transmitter and a wireless power receiver according to another embodiment of the present disclosure.
Figure 6:
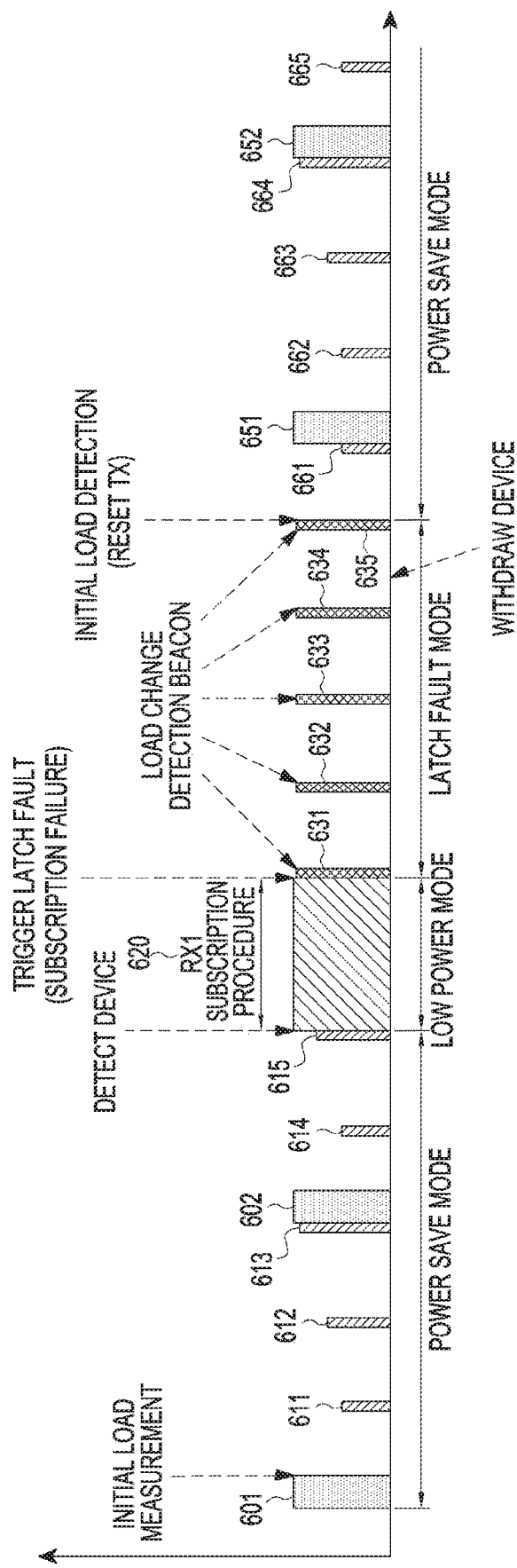
FIG. 6 is a graph of the amount of power applied by a wireless power transmitter against the time axis.

FIG. 5 is a flowchart illustrating operations of a wireless power transmitter and a wireless power receiver according to another embodiment of the present disclosure. The method of FIG. 5 will be described in more detail with reference to FIG. 6. FIG. 6 is a graph of the amount of power applied by the wireless power transmitter according to the embodiment of FIG. 5 against the time axis.

As illustrated in FIG. 5, the wireless power transmitter may initiate driving in operation S501. Further, the wireless power transmitter may reset an initial setting in operation S703. The wireless power transmitter may enter a power save mode in operation S505. Here, the power save mode may be an interval at which the wireless power transmitter applies different amounts of power to a power transmitting unit. For example, the power save mode may be an interval at which the wireless power transmitter applies second detection power 601 and 602 and third detection power 611, 612, 613, 614, and 615 of FIG. 6 to the power transmitting unit. Here, the wireless power transmitter may periodically apply the second power 601 and 602 by a second period. The wireless power transmitter may apply the second power 601 and 602 during a second duration. The wireless power transmitter may periodically apply the third detection power 611, 612, 613, 614, and 615 by a third period. The wireless power transmitter may apply the third detection power 611, 612, 613, 614, and 615 during a third duration. Although it is illustrated that the power values of each third detection power 611, 612, 613, 614, and 615 are different from one another, the power values of each third detection power 611, 612, 613, 614, and 615 may be the same as, or different from, one another.

The wireless power transmitter may output the third detection power 611 and then output the third detection power 612 having the same amount of power as that of the third detection power 611. If the wireless power transmitter outputs the third power having the same magnitude, the amount of the third power may have a sufficient amount of power to detect the smallest wireless power receiver, for example, a wireless power receiver of category 1.

The wireless power transmitter may output the third detection power 611 and then output the third detection power 612 having a different amount of power. When the wireless power transmitter outputs third detection power having different magnitudes, the amount of power of each third detection power may be the amount of power capable of detecting wireless power receivers of categories 1 to 5. For example, when the third detection power 611 may have the amount of power capable of detecting a wireless power receiver of category 5, the third detection power 612 may have the amount of power capable of detecting a wireless power receiver of category 3, and the third detection power 613 may have the amount of power capable of detecting a wireless power receiver of category 1.

Meanwhile, the second detection power 601 and 602 may be power capable of driving a wireless power receiver. More specifically, the second detection power 601 and 602 may have the amount of power capable of driving the controller and the communication unit of a wireless power receiver.

The wireless power transmitter may apply, to a power receiving unit, the second detection power 601 and 602 and the third detection power 611, 612, 613, 614, and 615 by the second period and the third period, respectively. When the wireless power receiver is disposed on the wireless power transmitter, impedance viewed from a point of the wireless power transmitter may change. The wireless power transmitter may detect a change in impedance while the second detection power 601 and 602 and the third detection power 611, 612, 613, 614, and 615 are applied. For example, the wireless power transmitter may detect a change in impedance while the third detection power 615 is applied. Accordingly, the wireless power transmitter may detect an object in operation S507. When the object is not detected in operation S507-N, the wireless power transmitter may maintain the power save mode in which different amounts of power are periodically applied.

Meanwhile, when impedance changes and the object is detected in operation S507-Y, the wireless power transmitter may enter a low power mode. Here, the low power mode is a mode in which the wireless power transmitter applies driving power with the amount of power capable of driving the communication unit of the wireless power receiver. For example, in FIG. 6, the wireless power transmitter may apply driving power 620 to the power transmitting unit. The wireless power receiver may receive the driving power 620 and drive the controller and/or the communication unit. The wireless power receiver may perform communication with the wireless power transmitter according to a predetermined scheme using the driving power 620. For example, the wireless power receiver may transmit and receive data required for authentication, and may subscribe to the wireless power network managed by the wireless power transmitter on the basis of the transmission/reception of the data. However, when a rogue object is disposed, instead of the wireless power receiver, the data transmission/reception may not be performed. Accordingly, the wireless power transmitter may determine whether the disposed object is a rogue object in operation S511. For example, when the wireless power transmitter does not receive a response from the object within a predetermined time, the wireless power transmitter may determine the object is a rogue object.

If it is determined that the object is a rogue object in operation S511-Y, the wireless power transmitter may enter a latch fault mode in operation S513. If it is determined that the object is not a rogue object in operation S511-N, however, a subscription process may be performed in operation S519. For example, the wireless power transmitter may periodically apply first power 631 to 634 of FIG. 6 by a first period. The wireless power transmitter may detect a change in impedance while applying the first power. For example, when the rogue object is withdrawn in operation S515-Y, a change in impedance may be detected and the wireless power transmitter may determine that the rogue object is withdrawn. Alternatively, when the rogue object is not withdrawn in operation S515-N, the wireless power transmitter may not detect a change in impedance and may determine that the rogue object is not withdrawn. When the rogue object is not withdrawn, the wireless power transmitter may output at least one of a lamp and a warning sound to inform a user that the wireless power transmitter is in an error state. Accordingly, the wireless power transmitter may include an output unit that outputs at least one of the lamp and the warning sound.

When it is determined that the rogue object is not withdrawn in operation S515-N, the wireless power transmitter may maintain the latch fault mode in operation S513. When it is determined that the rogue object is withdrawn in operation S515-Y, on the other hand, the wireless power transmitter may enter the power save mode again in operation S517. For example, the wireless power transmitter may apply the second power 651 and 652 and the third power 661 to 665 of FIG. 6.

As described above, when the rogue object is disposed, instead of the wireless power receiver, the wireless power transmitter may enter the latch fault mode. In addition, the wireless power transmitter may determine whether the rogue object is withdrawn on the basis of a change in impedance based on the power applied in the latch fault mode. That is, a condition for entering the latch fault mode in the embodiments of FIGS. 5 and 6 may be the disposition of a rogue object. There may be various conditions that enable the wireless power transmitter to enter the latch fault mode, in addition to the disposition of a rogue object. For example, the wireless power transmitter may be cross-connected with the disposed wireless power receiver, and may enter the latch fault mode in the above case.

Accordingly, when the cross connection occurs, the wireless power transmitter is required to return to the initial status and the wireless power receiver is required to be withdrawn. The wireless power transmitter may set the cross connection, in which a wireless power receiver disposed on another wireless power transmitter subscribes to the wireless power network, as the condition for entry into the latch fault mode. Operations of the wireless power transmitter when an error occurs including cross connection will be described with reference to FIG. 7.

Figure 7:
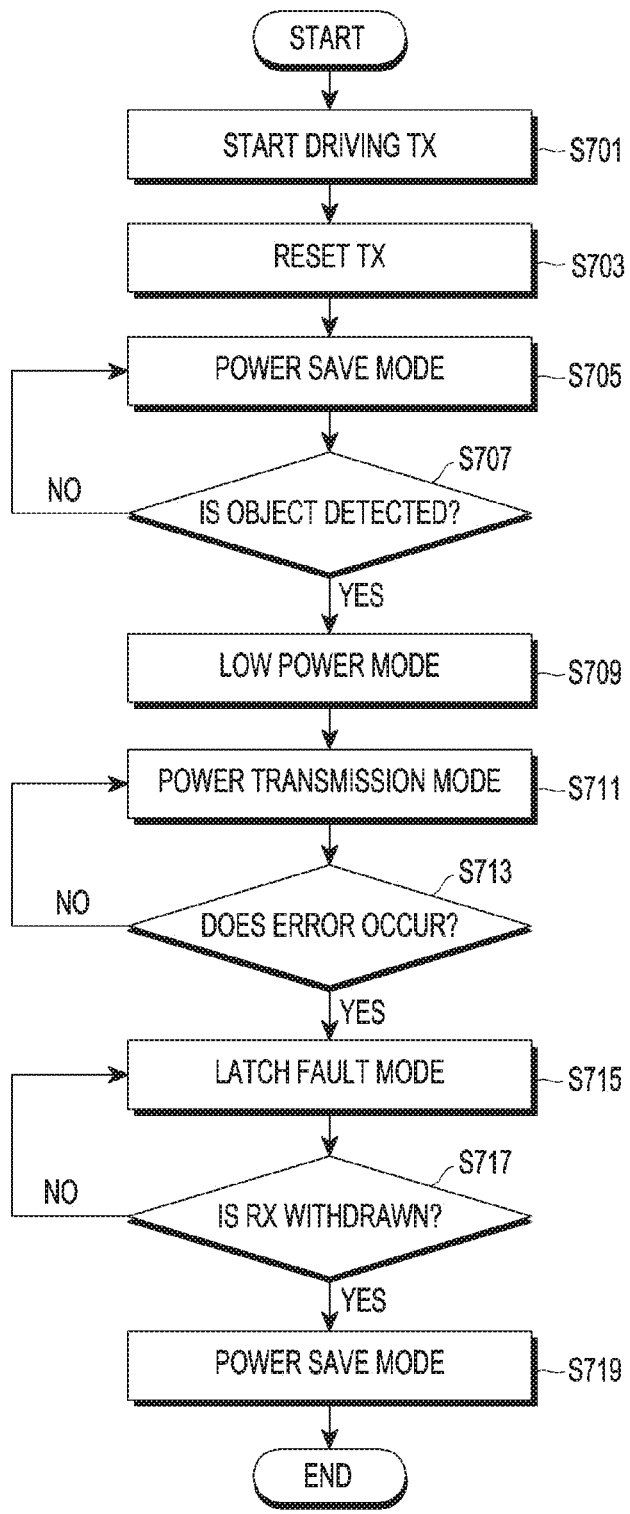
FIG. 7 is a flowchart illustrating a control method of a wireless power transmitter according to an embodiment of the present disclosure.
Figure 8:
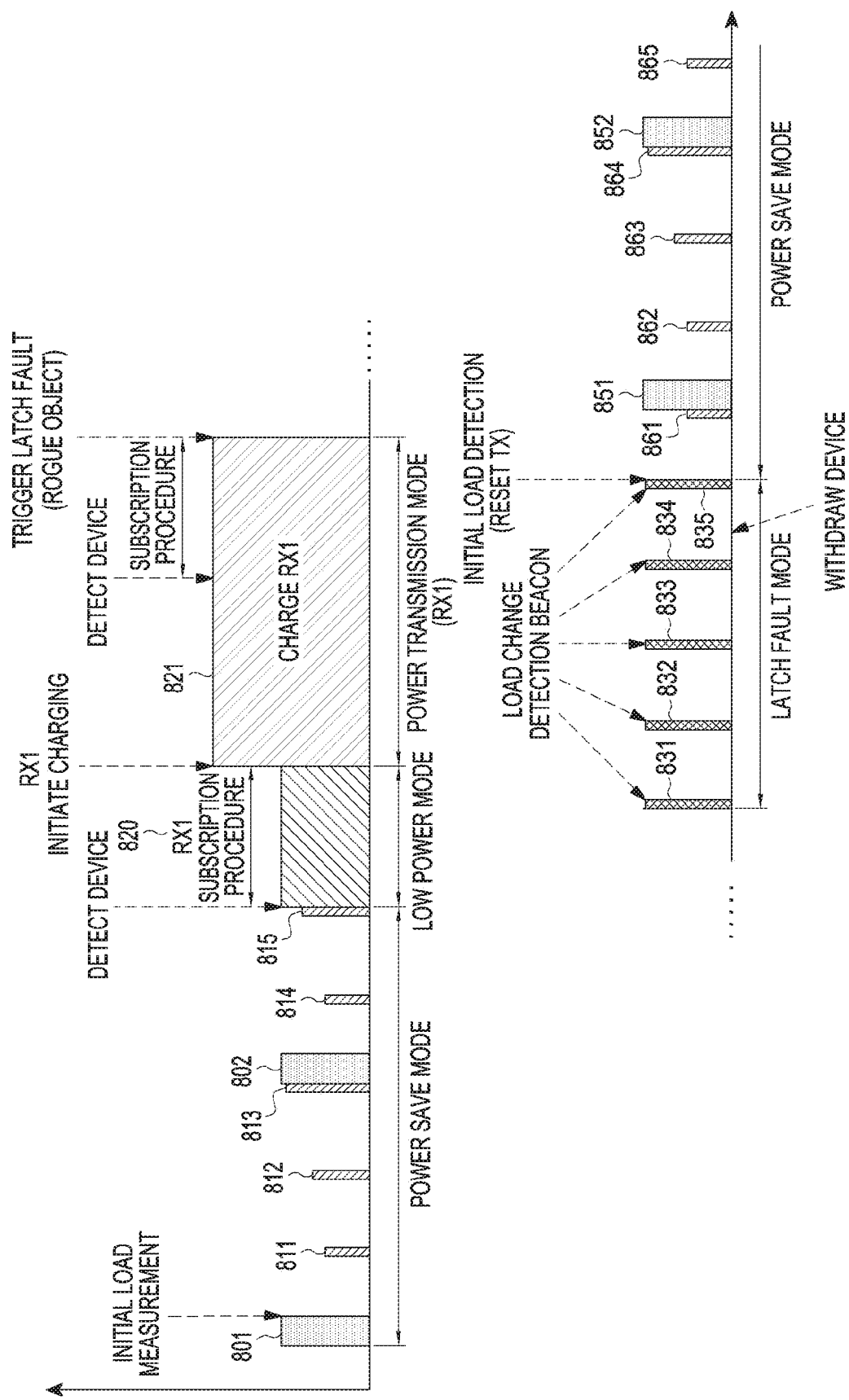
FIG. 8 is a graph of the amount of power applied by the wireless power transmitter according to the embodiment of FIG. 7 against the time axis.

FIG. 7 is a flowchart illustrating a control method of a wireless power transmitter according to an embodiment of the present disclosure. The control method of FIG. 7 will be described in more detail with reference to FIG. 8. FIG. 8 is a graph of the amount of power applied by a wireless power transmitter according to the embodiment of FIG. 7 against the time axis.

The wireless power transmitter may initiate driving in operation S701. Further, the wireless power transmitter may reset an initial setting in operation S703. The wireless power transmitter may enter a power save mode again in operation S705. Here, the power save mode may be an interval at which the wireless power transmitter applies different amounts of power to the power transmitting unit. For example, the power save mode may be an interval at which the wireless power transmitter applies the second detection power 801 and 802 and the third detection power 811, 812, 813, 814, and 815 of FIG. 8 to the power transmitting unit. Here, the wireless power transmitter may periodically apply the second power 801 and 802 by a second period. The wireless power transmitter may apply the second power 801 and 802, during a second duration. The wireless power transmitter may periodically apply the third detection power 811, 812, 813, 814, and 815 by a third period. The wireless power transmitter may apply the third detection power 811, 812, 813, 814, and 815 during a third duration. Although it is illustrated that the power values of each third detection power 811, 812, 813, 814, and 815 are different from one another, the power values of each third detection power 811, 812, 813, 814, and 815 may be the same as, or different from, one another.

Meanwhile, the second detection power 801 and 802 may be power capable of driving the wireless power receiver. More specifically, the second detection power 801 and 802 may have the amount of power capable of driving the controller and/or the communication unit of the wireless power receiver.

The wireless power transmitter may apply, to the power receiving unit, the second detection power 801 and 802 and the third detection power 811, 812, 813, 814, and 815 by the second period and the third period, respectively. When the wireless power receiver is disposed on the wireless power transmitter, impedance viewed from a point of the wireless power transmitter may change. The wireless power transmitter may detect a change in impedance while the second detection power 801 and 802 and the third detection power 811, 812, 813, 814, and 815 are applied. For example, the wireless power transmitter may detect a change in impedance while the third detection power 815 is applied. Accordingly, the wireless power transmitter may detect an object in operation S707. When the object is not detected in operation S707-N, the wireless power transmitter may maintain the power save mode in which different power is periodically applied in operation S705.

Meanwhile, when the impedance changes and the object is detected in operation S707-Y, the wireless power transmitter may enter a low power mode in operation S709. Here, the low power mode may be a mode in which the wireless power transmitter applies driving power with the amount of power capable of driving the controller and/or communication unit of the wireless power receiver. For example, in FIG. 8, the wireless power transmitter may apply driving power 820 to the power transmitting unit. The wireless power receiver may receive the driving power 820 and may drive the controller and/or the communication unit. The wireless power receiver may perform communication with the wireless power transmitter according to a predetermined scheme using the driving power 820. For example, the wireless power receiver may transmit and receive data required for authentication, and may subscribe to the wireless power network managed by the wireless power transmitter on the basis of the transmission and reception of data.

Subsequently, the wireless power transmitter may enter a power transmission mode in which charging power is transmitted in operation S711. For example, the wireless power transmitter may apply charging power 821 and the charging power may be transmitted to the wireless power receiver as illustrated in FIG. 8.

The wireless power transmitter may determine whether an error occurs in the power transmission mode. Here, the error may be the disposition of a rogue object on the wireless power transmitter, a cross connection, over voltage, over current, over temperature, and the like. The wireless power transmitter may include a sensing unit that may measure over voltage, over current, over temperature and the like. For example, the wireless power transmitter may measure the voltage or the current at a reference position. When the measured voltage or current is greater than a threshold, it is determined that conditions for determining the over voltage or the over current are satisfied. Alternatively, the wireless power transmitter may include a temperature sensing unit and the temperature sensing unit may measure the temperature at a reference position of the wireless power transmitter. When the temperature at the reference position is greater than a threshold, the wireless power transmitter may determine that a condition for determining the over temperature is satisfied.

Meanwhile, when an over voltage, over current, or over temperature status is determined according to the measurement value of the temperature, voltage, or current, the wireless power transmitter prevents the over voltage, over current, or over temperature by reducing the wireless charging power by a predetermined value. In this instance, when the voltage value of the reduced wireless charging power is lower than a predetermined minimum value (e.g., the minimum voltage value (VRECT_MIN_DYN) of the back end of the rectifier of the wireless power receiver), wireless charging is stopped so that a voltage set value may be re-controlled according to an embodiment of the present disclosure.

Although it has been illustrated that an error occurs because the rogue object is additionally disposed on the wireless power transmitter in the embodiment of FIG. 8, the error is not limited thereto and it will be easily understood by those skilled in the art that the wireless power transmitter operates in a similar manner with respect to the disposition of a rogue object, cross connection, over voltage, over current, and over temperature.

When the error does not occur in operation S713-N, the wireless power transmitter may maintain the power transmission mode in operation S711. When the error occurs in operation S713-Y, the wireless power transmitter may enter a latch fault mode in operation S715. For example, the wireless power transmitter may apply first power 831 to 835 as illustrated in FIG. 8. Further, the wireless power transmitter may output an error occurrence indication including at least one of a lamp and a warning sound during the latch fault mode. When it is determined that the rogue object is not withdrawn in operation S717-N, the wireless power transmitter may maintain the latch fault mode in operation S715. Meanwhile, when it is determined that the rogue object is withdrawn in operation S717-Y, the wireless power transmitter may enter the power save mode again in operation S719. For example, the wireless power transmitter may apply second power 851 and 852 and third power 861 to 865 of FIG. 8.

In the above descriptions, the operations performed when an error occurs while the wireless power transmitter transmits charging power have been described. Hereinafter, operations performed when a plurality of wireless power receivers disposed on a wireless power transmitter receives charging power will be described.

Figure 9:
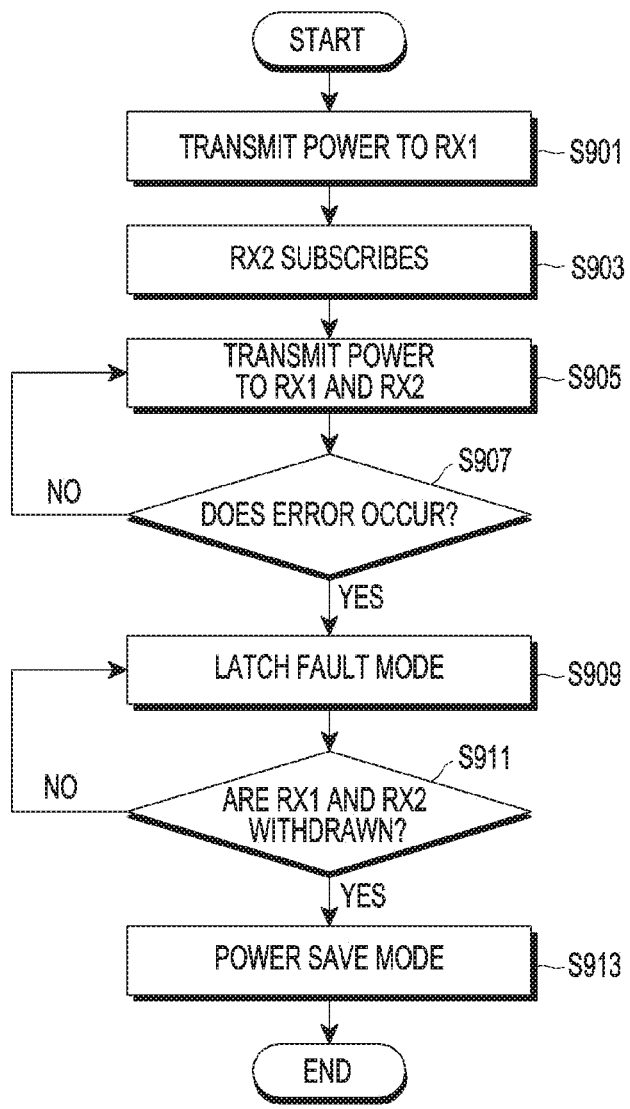
FIG. 9 is a flowchart illustrating a control method of a wireless power transmitter according to an embodiment of the present disclosure.
Figure 10:
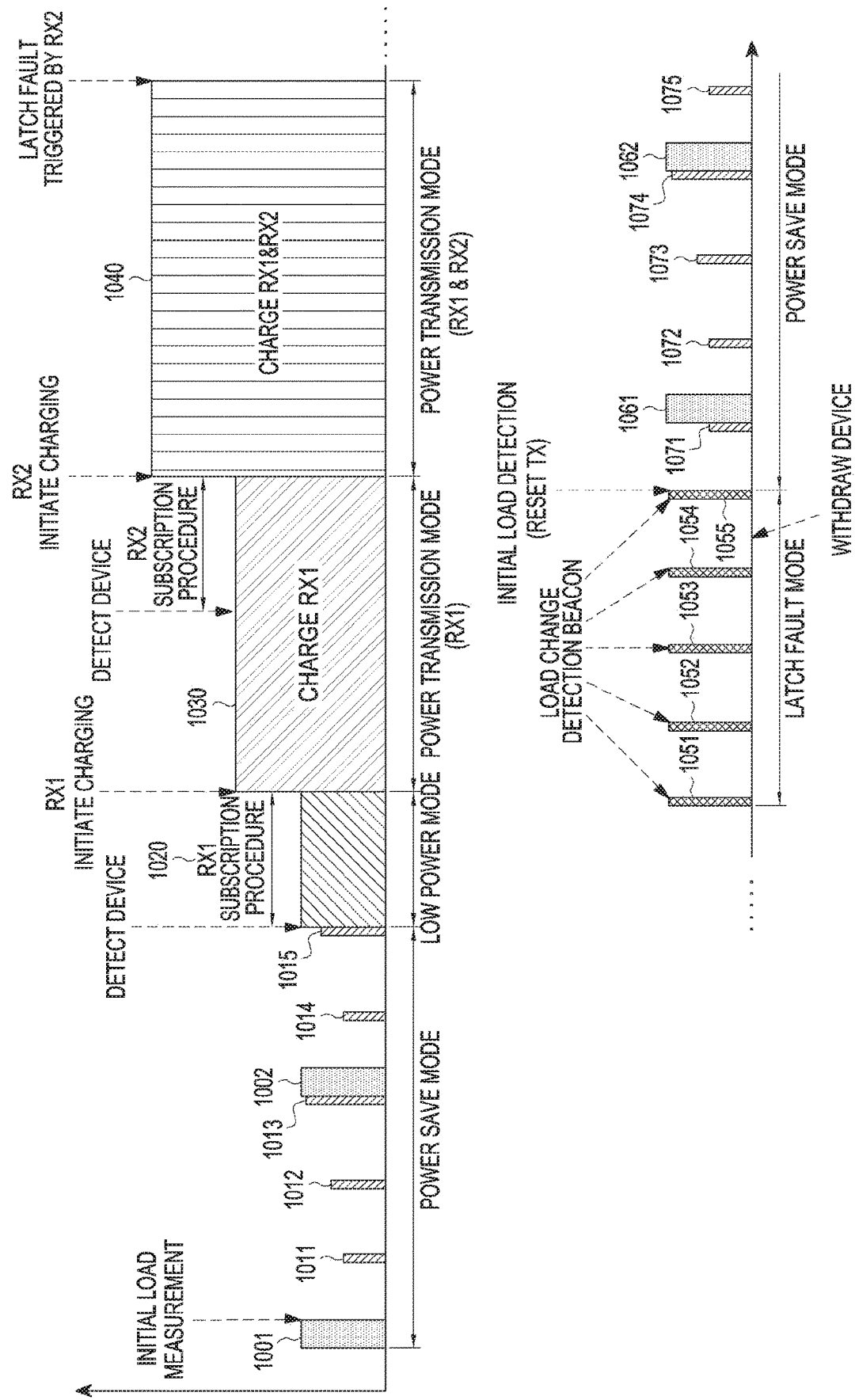
FIG. 10 is a graph of the amount of power applied by the wireless power transmitter according to the embodiment of FIG. 9 against the time axis.

FIG. 9 is a flowchart illustrating a control method of a wireless power transmitter according to an embodiment of the present disclosure. The method of FIG. 9 will be described in more detail with reference to FIG. 10. FIG. 10 is a graph of the amount of power applied by a wireless power transmitter according to the embodiment of FIG. 9 against the time axis.

As illustrated in FIG. 9, the wireless power transmitter may transmit charging power to a first wireless power receiver in operation S901. In addition, the wireless power transmitter may additionally allow a second wireless power transmitter to subscribe to a wireless power network in operation S903. The wireless power transmitter may transmit charging power to the second wireless power receiver in operation S905. More specifically, the wireless power transmitter may apply the sum of the charging power required by the first wireless power receiver and the second wireless power receiver to a power receiving unit.

FIG. 10 illustrates an embodiment of operations S901 to S905. For example, the wireless power transmitter may maintain a power save mode in which second detection power 1001 and 1002 and third detection power 1011 to 1015 are applied. Thereafter, the wireless power transmitter may detect the first wireless power receiver and enter a low power mode in which detection power 1020 is maintained. Subsequently, the wireless power transmitter may enter a power transmission mode in which first charging power 1030 is applied. The wireless power transmitter may detect the second wireless power receiver and may allow the second wireless power receiver to subscribe to the wireless power network. Further, the wireless power transmitter may apply second charging power 1040 having the amount of power corresponding to the sum of the amount of power required by the first wireless power receiver and the second wireless power receiver.

Referring again to FIG. 9, the wireless power transmitter may detect the occurrence of an error in operation S907 while transmitting charging power to both the first and second wireless power receivers in operation S905. Here, the error may be the existence of a rogue object, cross connection, over voltage, over current, over temperature, and the like. When the error does not occur in operation S907-N, the wireless power transmitter may maintain the application of the second charging power 1040.

Meanwhile, when an error occurs in operation S907-Y, the wireless power transmitter may enter a latch fault mode in operation S909. For example, the wireless power transmitter may apply the first power 1051 to 1055 of FIG. 10 by a first period. The wireless power transmitter may determine whether both the first wireless power receiver and the second wireless power receiver are withdrawn in operation S911. For example, the wireless power transmitter may detect a change in impedance while applying the first power 1051 to 1055. The wireless power transmitter may determine whether both the first wireless power receiver and the second wireless power receiver are withdrawn on the basis of whether the impedance returns to an initial value.

When it is determined that both the first wireless power receiver and the second wireless power receiver are withdrawn in operation S911-Y, the wireless power receiver may enter a power save mode in operation S913. For example, the wireless power transmitter may apply second detection power 1061 and 1062 and third detection power 1071 to 1075 of FIG. 10 by a second period and a third period, respectively.

As described above, even when the wireless power transmitter applies charging power to a plurality of wireless power receivers, the wireless power transmitter may determine whether a wireless power receiver or a rogue object can be easily withdrawn when an error occurs.

Figure 11:
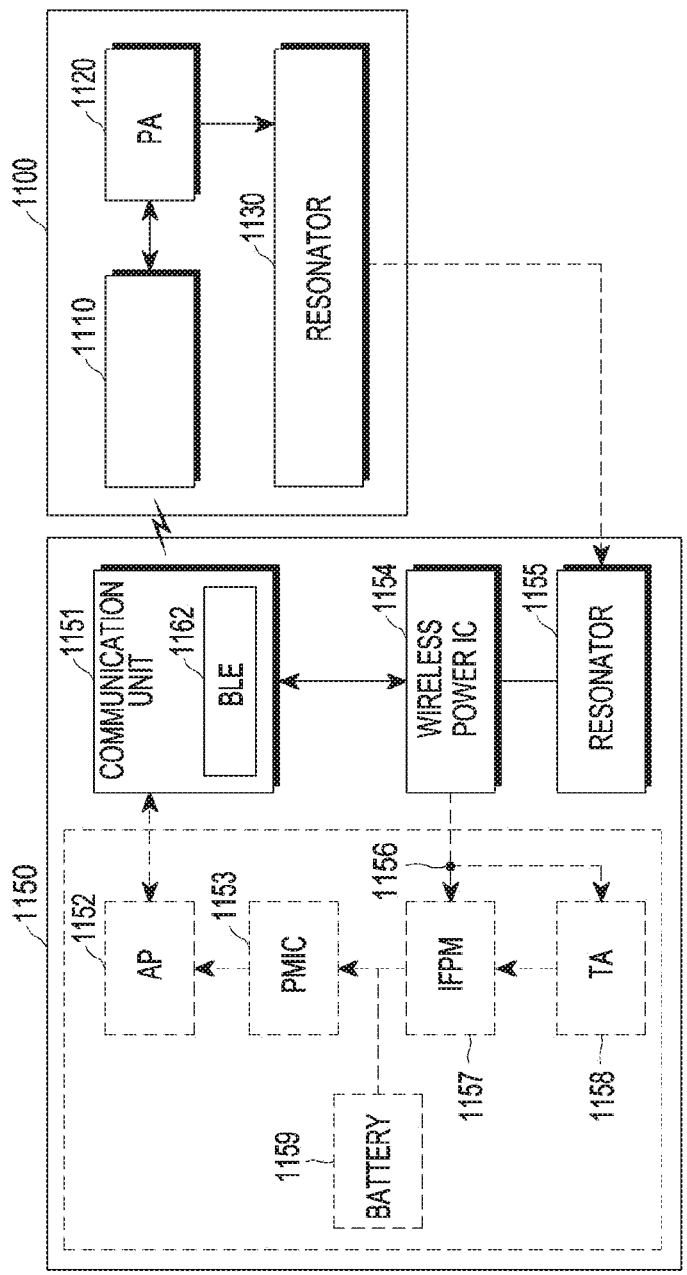
FIG. 11 is a block diagram illustrating a wireless power transmitter and a wireless power receiver in an SA mode according to an embodiment of the present disclosure.

FIG. 11 is a block diagram of a wireless power transmitter and a wireless power receiver in a standalone (SA) mode according to an embodiment of the present disclosure.

A wireless power transmitter 1100 may include a communication unit 1110, a power amplifier (PA) 1120, and a resonator 1130. A wireless power receiver 1150 may include a communication unit (WPR communication IC) 1151, an application processor (AP) 1152, a power management integrated circuit (PMIC) 1153, a wireless power integrated circuit (WPIC) 1154, a resonator 1155, an interface power management (IFPM) IC 1157, a wired charging adapter (travel adapter (TA)) 1158, and a battery 1159.

The communication unit 1110 may be implemented as a WiFi/Bluetooth (BT) combo IC and may communicate with the communication unit 1151 in a predetermined scheme, for example, a BLE scheme. For example, the communication unit 1151 of the wireless power receiver 1150 may transmit a PRU dynamic signal having the data structure of Table 1 to the communication unit 1110 of the wireless power transmitter 1100. As described above, the PRU dynamic signal may include at least one of voltage information, current information, temperature information and alert information of the wireless power receiver 1150.

The value of the power output from the power amplifier 1120 may be adjusted on the basis of the received PRU dynamic signal. For example, when the overvoltage, the overcurrent, and the over-temperature are applied to the wireless power receiver 1150, the value of the power output from the power amplifier 1120 may be reduced. Further, when the voltage or current of the wireless power receiver 1150 is smaller than a predetermined value, the value of the power output from the power amplifier 1120 may be increased.

Charging power from the resonator 1130 may be wirelessly transmitted to the resonator 1155.

The wireless power integrated circuit 1154 may rectify the charging power received from the resonator 1155, and may perform DC/DC converting of the rectified charging power. The wireless power integrated circuit 1154 may use the converted power to drive the communication unit 1151 or to charge the battery 1159.

Meanwhile, a wired charging terminal may be inserted into the wired charging adapter 1158. The wired charging adapter 1158 may have the wired charging terminal such as a 30 pin connector or a USB connector which is inserted in the wired charging adapter 1158, and may receive power supplied from an external power source to charge the battery 1159.

The interface power management integrated circuit 1157 may process power applied from the wired charging terminal and may output the processed power to the battery 1159 and the power management integrated circuit 1153.

The power management integrated circuit 1153 may manage power received wiredly or wirelessly, and power applied to each of the elements of the wireless power receiver 1150. The application processor 1152 may receive power information from the power management integrated circuit 1153, and may control the communication unit 1151 to transmit a PRU dynamic signal in order to report the received power information.

The wired charging adapter 1158 may also be connected to a node 1156 connected to the wireless power integrated circuit 1154. When the wired charging connector is inserted into the wired charging adapter 1158, a predetermined voltage, for example, a voltage of 5V, may be applied to the node 1156. The wireless power integrated circuit 1154 may monitor the voltage applied to the node 1156, and may determine whether the wired charging adapter is inserted.

Meanwhile, the application processor 1152 has a stack of a predetermined communication scheme, for example, a WiFi/BT/BLE stack. Accordingly, in communication for wireless charging, the communication unit 1151 loads the stack from the application processor 1152 and then communicates with the communication unit 1110 of the wireless power transmitter 1100 using a BT or BLE communication scheme based on the stack.

However, a state may occur in which it is difficult to fetch data for performing wireless power transmission from the application processor 1152 since the application processor 1152 is turned off, or in which power is lost such that the application processor 1152 has difficulty staying in the On status while the data is fetched from a memory in the application processor 1152 and used.

As described above, when the amount of charge remaining in the battery 1159 is less than the minimum power threshold value, the application processor 1152 is turned off, and wireless charging may be performed using some elements for wireless charging disposed in the wireless power receiver, for example, the communication unit 1151, the wireless power integrated circuit 1154, the resonator 1155, and the like. Here, the state in which the amount of power that allows the application processor 1152 to be turned on is not supplied may be referred to as a dead battery status.

Since the application processor 1152 is not driven in the dead battery status, the communication unit 1151 may not receive a stack of a predetermined communication scheme, for example, a WiFi/BT/BLE stack, from the application processor 1152. Against the above-described case, some of the stacks of the predetermined communication scheme, for example, a BLE stack, may be fetched from the application processor 1152, and may be stored in the memory 1162 of the communication unit 1151 in advance. Accordingly, the communication unit 1151 may communicate with the wireless power transmitter 1100 for wireless charging using the stack of the communication scheme stored in the memory 1162, that is, a wireless charging protocol. In this instance, the communication unit 1151 may include a memory therewithin, and the BLE stack may be stored in a memory in the form of a ROM in the SA mode.

As described above, a mode in which the communication unit 1151 performs communication using the stack of the communication scheme stored in the memory 1162 may be named the SA mode. Accordingly, the communication unit 1151 may manage a charging procedure on the basis of the BLE stack.

The concept of a wireless charging system that is applicable to the embodiments of the present disclosure has been described with reference to FIGS. 1 to 11. Hereinafter, a wireless power transmitter and a wireless power receiver, according to an embodiment of the present disclosure, will be described in detail with reference to FIGS. 12 to 19.

Figure 12:
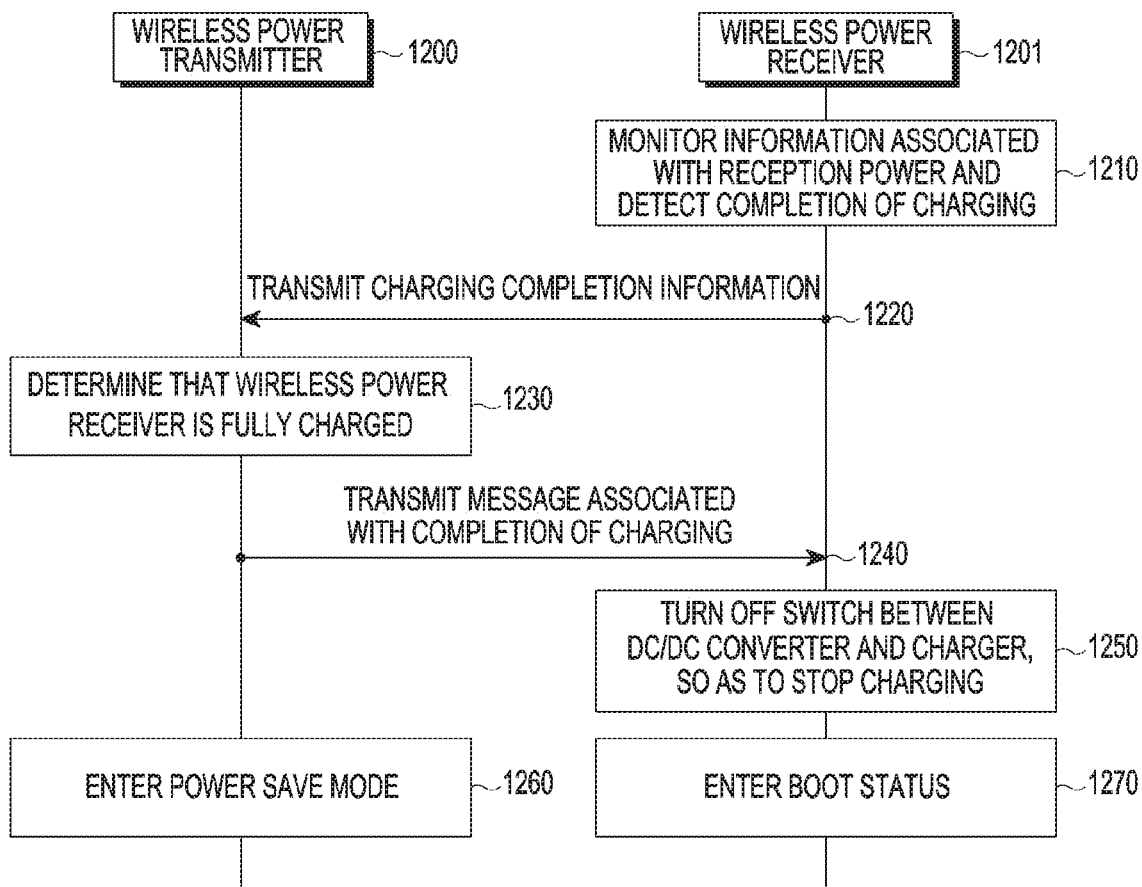
FIG. 12 is a flowchart illustrating operations of a wireless power transmitter and a wireless power receiver according to various embodiments of the present disclosure.

FIG. 12 is a flowchart illustrating operations of a wireless power transmitter and a wireless power receiver according to various embodiments of the present disclosure.

In operation 1210, a wireless power receiver 1201 may detect the completion of charging by monitoring information related to received power. A wireless power transmitter 1200 may transmit power for charging, and the wireless power receiver 1201 may detect the completion of charging while receiving power for charging and performing charging. According to various embodiments of the present disclosure, the wireless power receiver 1201 may monitor at least one of the voltage at the output end of a rectifier, the current at the output end of the rectifier, the voltage at the output end of a DC/DC converter, the current at the output end of the DC/DC converter, the voltage applied to the battery, the current applied to the battery, and the amount of power remaining in the battery. When the monitoring result satisfies a predetermined condition, the wireless power receiver 1201 may determine that the completion of charging is detected.

In operation 1220, the wireless power receiver 1201 may transmit charging completion information to the wireless power transmitter 1200. The wireless power transmitter 1200 and the wireless power receiver 1201 may be set in advance to perform a charging completion procedure. For example, the wireless power receiver 1201 may transmit a PRU dynamic signal to the wireless power transmitter 1200 by including charging completion information in the PRU dynamic signal. The wireless power receiver 1201 may set a flag of a charge complete field included in the PRU dynamic signal to "1", and may transmit the same to the wireless power transmitter 1200. Before being fully charged, the wireless power receiver 1201 may set the flag of the charge complete field included in the PRU dynamic signal to "0" and may transmit the same to the wireless power transmitter 1200. That is, when the wireless power receiver 1201 no longer needs to be charged by the wireless power transmitter 1200, the wireless power receiver 1201 may transmit a PRU dynamic signal by setting the flag of the charge complete field to "1".

In operation 1230, the wireless power transmitter 1200 may determine that the wireless power receiver 1201 is fully charged. The wireless power transmitter 1200 identifies that the flag of the charge complete field of the PRU dynamic signal is "1", and may determine that the wireless power receiver 1201 is fully charged.

In operation S1240, the wireless power transmitter 1200 may transmit a message associated with the completion of charging. The message associated with the completion of charging may be a message that enables the wireless power receiver 1201 to stop charging. For example, in operation 1250, the wireless power receiver 1201 may turn off the switch between the DC/DC converter and a charger, thereby stopping charging. According to various embodiments of the present disclosure, the wireless power transmitter 1200 may transmit a PRU control signal to the wireless power receiver 1201 by setting an enable PRU output bit to "0" in an enables field of the PRU control signal. The wireless power receiver 1201 may identify that the enable PRU output bit in the enables field of the PRU control signal is set to "0", and may deactivate outputting for charging in response thereto.

The wireless power transmitter 1200 may or may not maintain a communication connection (e.g., BLE connection) with the wireless power receiver 1201.

According to various embodiments, in operation 51260, the wireless power transmitter 1200 may enter a power save mode. Accordingly, the wireless power transmitter 1200 may stop transmission of charging power, and may apply beacons of different magnitudes to a resonator. In operation S1270, the wireless power receiver 1201 may enter a boot status. In this instance, when the wireless power transmitter 1200 enters the power save mode, the wireless power transmitter 1201 may increase a connection interval for the economy of power.

Figure 13:
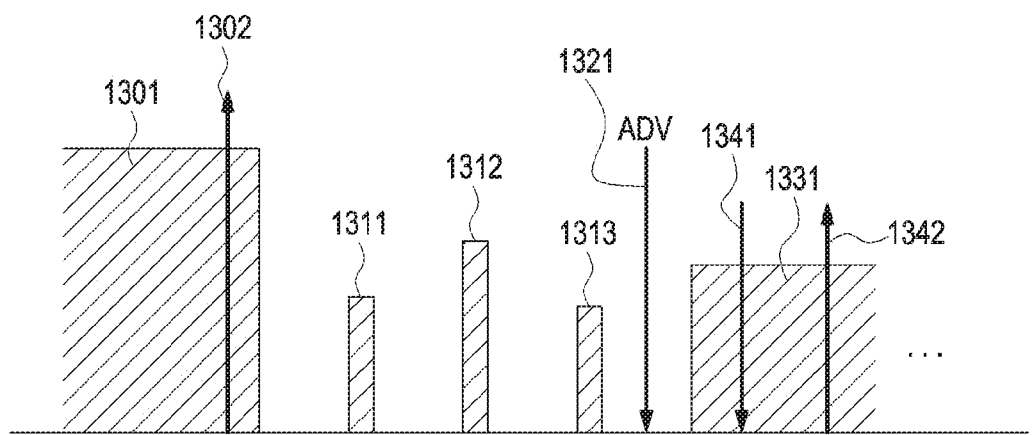
FIG. 13 is a conceptual diagram illustrating signal transmission and reception according to a comparative example used for comparison with the present disclosure.

FIG. 13 is a conceptual diagram illustrating signal transmission and reception according to a comparative example used for comparison with the present disclosure.

Referring to FIG. 13, a wireless power transmitter according to a comparative example may transmit charging power 1301. The wireless power transmitter according to the comparative example determines that a wireless power receiver is fully charged, and may transmit a signal 1302 related to the completion of charging to the wireless power receiver. The wireless power transmitter according to the comparative example may enter a power save mode and may apply beacons 1311, 1312, and 1313 to a resonator. The wireless power receiver may transmit an advertisement (ADV) 1321 after entering a boot status, and the wireless power transmitter according to the comparative example may receive the advertisement (ADV) 1321. The wireless power transmitter according to the comparative example may enter a low power mode (lower power) on the basis of the reception of the advertisement (ADV) 1321 and a change in the load, and may transmit power 1331 corresponding to the low power mode. In addition, the wireless power transmitter according to the comparative example may exchange a PRU static signal 1341 and a PTU static signal 1342 with the wireless power receiver. Also, although not illustrated, subsequently, the wireless power transmitter according to the comparative example may proceed with a subscription procedure and charging power transmission, and may stop charging after a PRU dynamic signal of which the flag of the charge complete field is "1" is received from the wireless power receiver again. Afterward, the wireless power transmitter according to the comparative example may repeat the above-described process.

Figure 14:
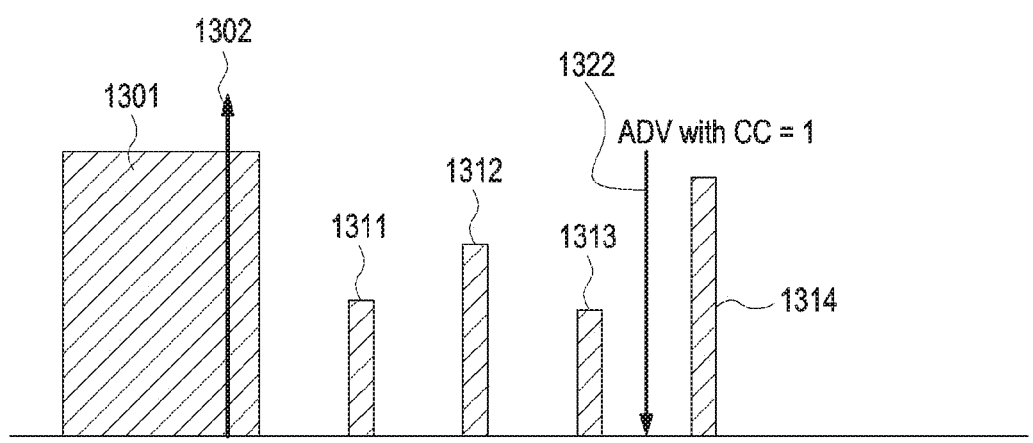
FIG. 14 is a conceptual diagram illustrating signal transmission and reception according to various embodiments of the present disclosure.

FIG. 14 is a conceptual diagram illustrating signal transmission and reception according to various embodiments of the present disclosure.

A wireless power receiver 1201, according to various embodiments of the present disclosure, may transmit an advertisement signal 1322 to a wireless power transmitter 1200 by including charging completion information in the advertisement signal 1322. For example, Table 5 is an advertisement flag field according to various embodiments of the present disclosure.

As described above, the wireless power receiver 1201, according to various embodiments of the present disclosure, may define a Reboot or Charge status bit in the field of bit 4. The fact that the corresponding bit indicates "0" may define that a recent reset or charging is requested. The fact that the corresponding bit indicates "1" may define a connection drop with no reset or may define no request for charging. The insertion of charging related information to the field of bit 4 is merely an example, and the charging related information may be inserted into any of the fields of the advertisement.

The wireless power transmitter 1200 may receive an advertisement signal 1322 including information indicating that charging is not requested, and the wireless power transmitter 1200 may maintain the power save mode. Accordingly, the wireless power transmitter 1200 may apply a beacon 1314.

As described above, the wireless power transmitter 1200 may not need to perform a detection procedure, a subscription procedure, and a charging procedure, again, whereby resources and power may be used economically.

Figure 15:
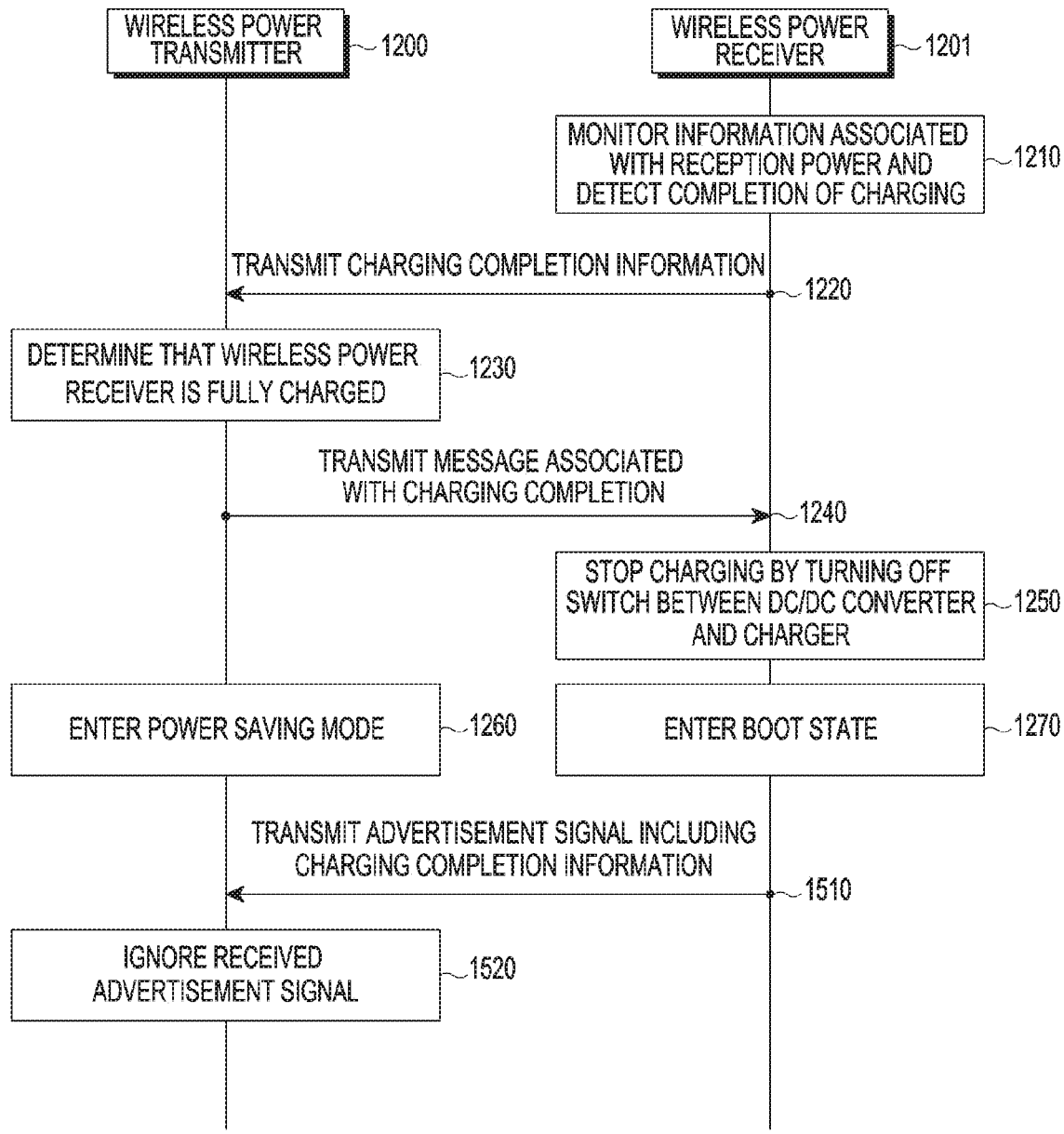
FIG. 15 is a flowchart illustrating operations of a wireless power transmitter and a wireless power receiver according to various embodiments of the present disclosure.

FIG. 15 is a flowchart illustrating operations of a wireless power transmitter and a wireless power receiver according to various embodiments of the present disclosure.

Operations 1210 to 1270 have been described with reference to FIG. 12, further descriptions thereof will be omitted.

In operation 1510, the wireless power receiver 1201 may transmit an advertisement signal including charging completion information. In operation 1520, the wireless power transmitter 1200 may disregard the received advertisement signal, and accordingly, may maintain a power save mode.

Figure 16:
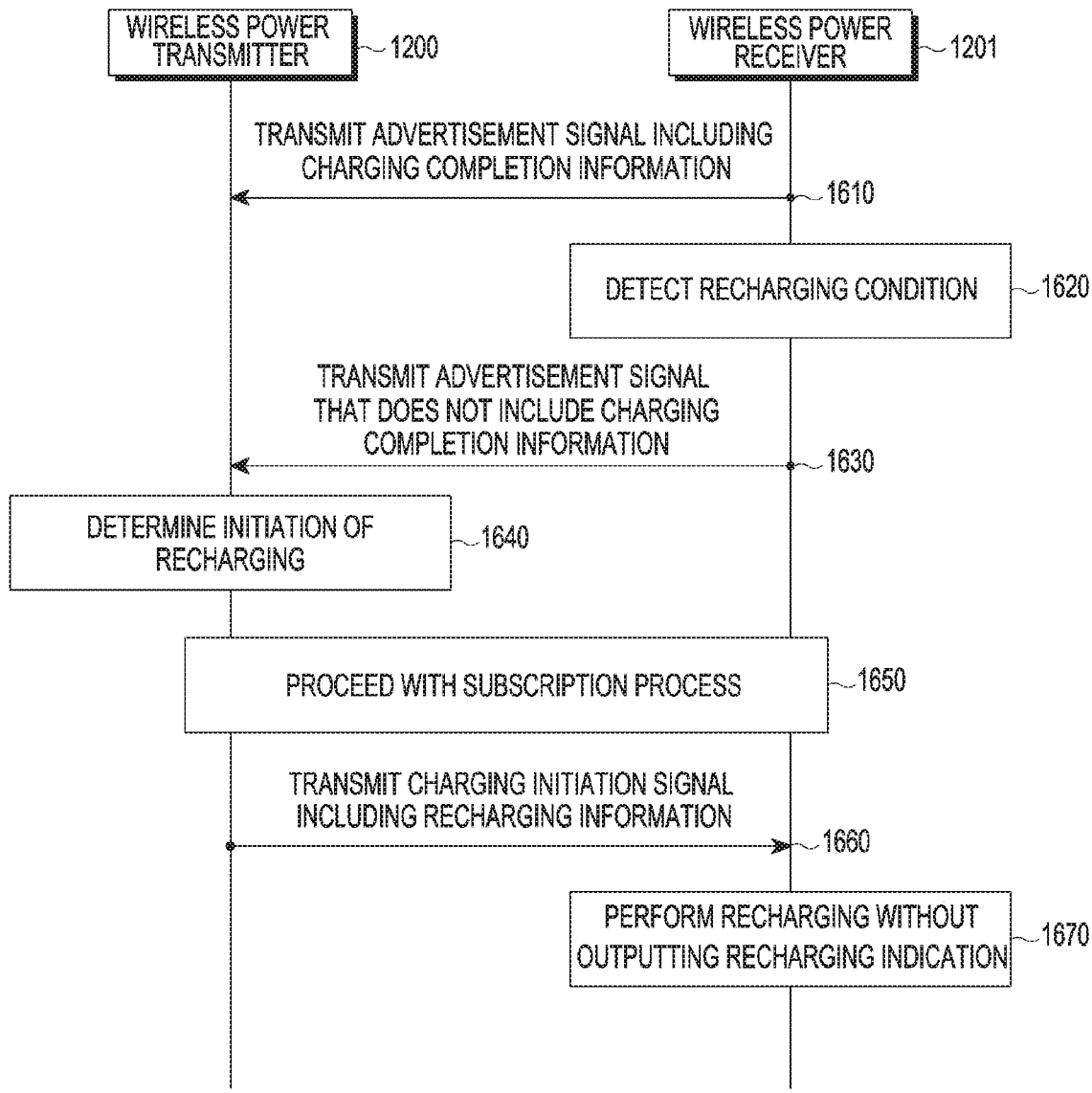
FIG. 16 is a flowchart illustrating operations of a wireless power transmitter and a wireless power receiver according to various embodiments of the present disclosure.

FIG. 16 is a flowchart illustrating operations of a wireless power transmitter and a wireless power receiver according to various embodiments of the present disclosure.

In operation 1610, the wireless power receiver 1201 may transmit an advertisement signal including charging completion information. In operation 1620, the wireless power receiver 1201 may detect a recharging condition. According to various embodiments of the present disclosure, the wireless power receiver 1201 may determine whether at least some of the amount of power remaining in a battery, the voltage of the battery, and the current of the battery satisfies a predetermined recharging condition. For example, when it is determined that the amount of power remaining in the battery is less than a predetermined threshold value, the wireless power receiver 1201 may determine that a recharging condition is detected.

In operation 1630, the wireless power receiver 1201 may transmit an advertisement signal that does not include charging completion information. For example, the wireless power receiver 1201 may transmit an advertisement signal of which the bit 4 is set to "0" as shown in Table 5.

When the advertisement signal that does not include charging completion information is received, the wireless power transmitter 1200 may determine the initiation of recharging in operation 1640. In operation 1650, the wireless power transmitter 1200 may proceed with a subscription process. For example, the wireless power transmitter 1200 may switch from the power save mode to a low power mode, and may operate according to the low power mode. Subsequently, the wireless power transmitter 1200 may switch from the low power mode to a power transmission mode,

TABLE 5

| 7 | 6 | 5 | 4 | 3 | 2 | 1 | 0 |
|---|---|---|---|---|---|---|---|
| Impedance Shift Bit 2 | Impedance Shift Bit 1 | Impedance Shift Bit 0 | Reboot or Charge status bit | OVP status (optional) | Time set support | RFU | RFU | and may charge the wireless power receiver 1201. In operation 1660, the wireless power transmitter 1200 may transmit a charging initiation signal including recharging information. In operation 1670, the wireless power receiver 1201 may perform charging, and may perform recharging without outputting a charging indication. According to various embodiments, the recharging information may be included in any signal that is output from the wireless power transmitter 1200, in addition to the charging initiation signal, which is easily understood by those skilled in the art. As described above, even when the amount of power remaining in the battery decreases since the charging time elapses, recharging may be additionally performed. Every time recharging is performed, an indicator such as a voice, an indication, or the like indicating charging may not be output.

Figure 17:
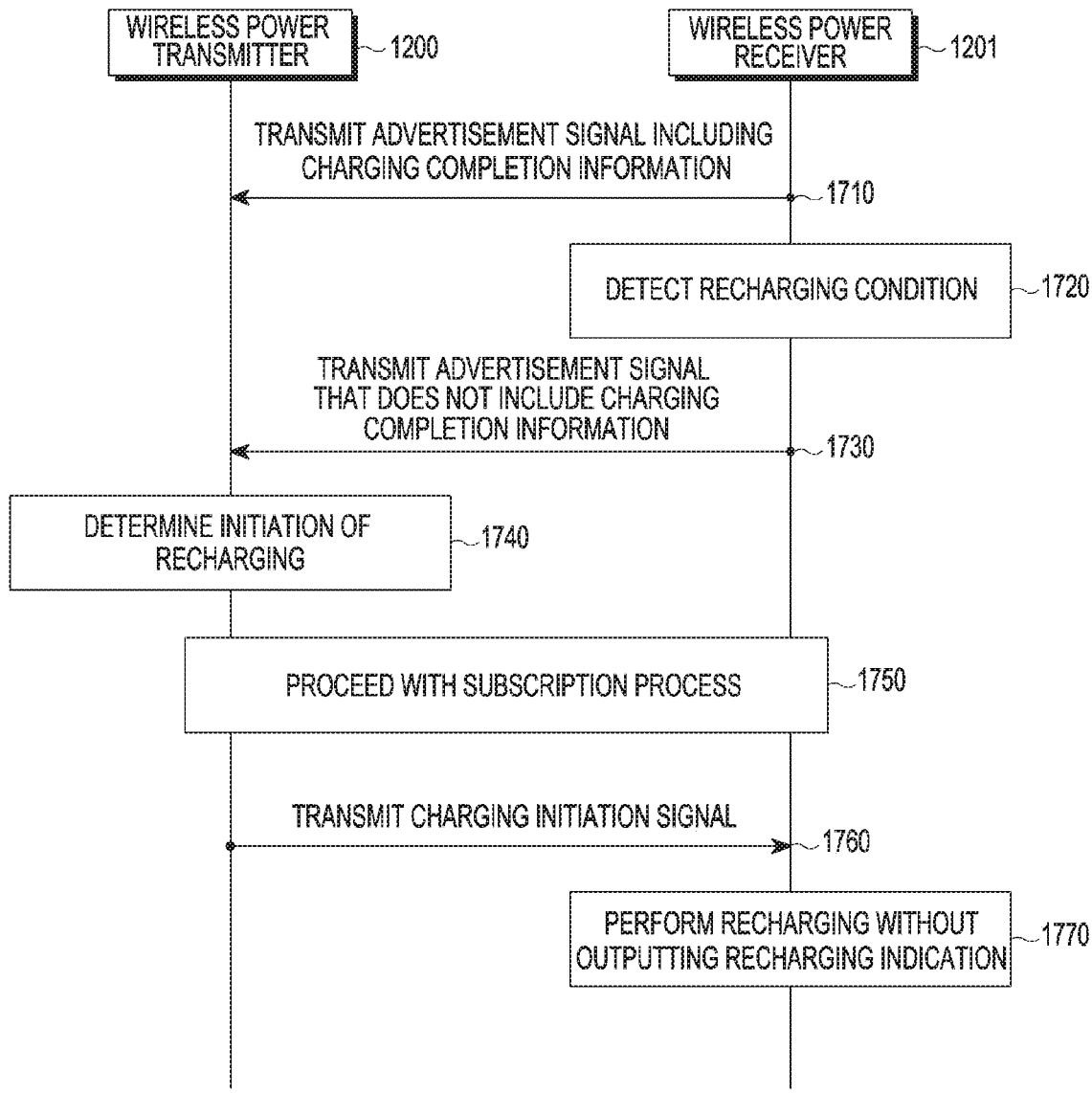
FIG. 17 is a flowchart illustrating operations of a wireless power transmitter and a wireless power receiver according to various embodiments of the present disclosure.

FIG. 17 is a flowchart illustrating operations of a wireless power transmitter and a wireless power receiver according to various embodiments of the present disclosure.

In operation S1710, the wireless power receiver 1201 may transmit an advertisement signal including charging completion information. In operation S1720, the wireless power receiver 1201 may detect a recharging condition. In operation S1730, the wireless power receiver 1201 may transmit an advertisement signal that does not include charging completion information. The wireless power transmitter 1200 may determine the initiation of recharging in operation S1740, and a subscription process is performed in operation 1750. In operation 1760, the wireless power transmitter 1200 may transmit a charging initiation signal. In operation 1760, the charging initiation signal that the wireless power transmitter 1200 transmits may not include recharging related information.

In operation 1770, the wireless power receiver 1201 may perform recharging without outputting a charging indication. The wireless power receiver 1201 may be configured not to output a charging indication on the basis of the determination of initiation of recharging.

Figure 18:
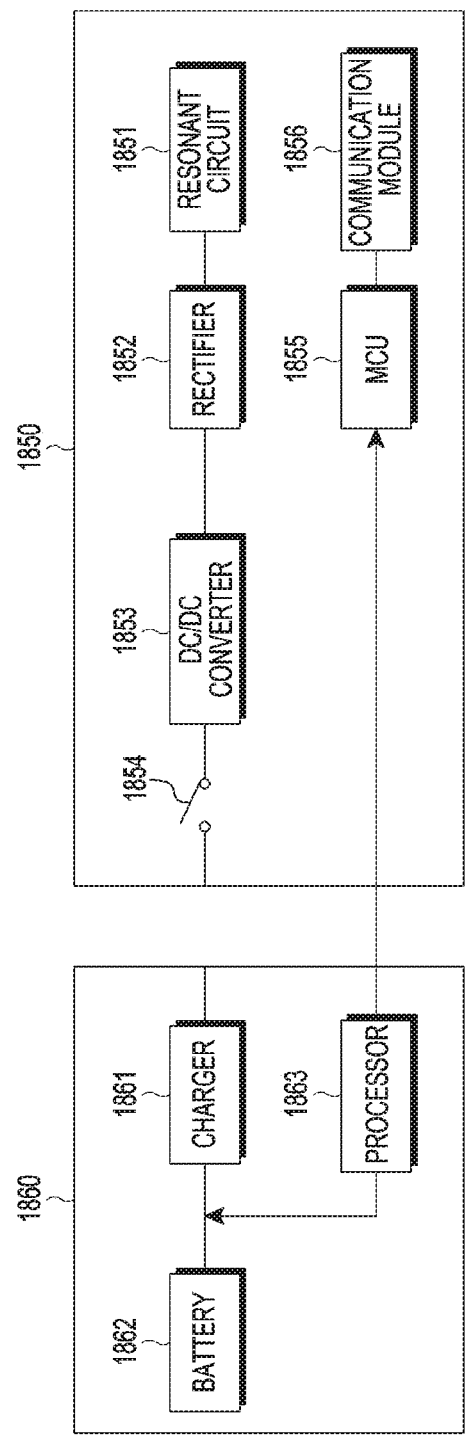
FIG. 18 is a block diagram illustrating an electronic device and a wireless power receiver according to various embodiments of the present disclosure.

FIG. 18 is a block diagram illustrating an electronic device and a wireless power receiver according to various embodiments of the present disclosure.

According to an embodiment of FIG. 18, an electronic device 1860 including a battery 1862, and a wireless power receiver 1850 may be structured to be detachable. For example, the electronic device 1860 may be implemented as a smartphone, a tablet PC, or the like. The wireless power receiver 1850 may be a circuit included in a cover that may receive the smartphone or the tablet PC. Referring to FIG. 18, it is illustrated that a charger 1861 and a switch 1854 are not connected. This shows the case in which the electronic device 1860 and the wireless power receiver 1850 are detached. When the electronic device 1860 is installed to the cover including the wireless power receiver 1850, one end of the charger 1861 and one end of the switch 1754 may be connected. In this instance, after power is received by a resonant circuit 1851 and is rectified by rectifier 1852, the voltage of the power is converted by a DC/DC converter 1853, and the power may be transferred to the charger 1861. When a charging function control signal that enables a charging function is received by the communication module 1856, an MCU 1855 may close the switch 1854. When a charging function control signal that disables the charging function is received by the communication module 1856, the MCU 1855 may open the switch 1854.

A processor 1863 of the electronic device 1860 monitors the battery 1862, and may detect a recharging condition. When the recharging condition is detected, the processor 1863 may transmit recharging related information to the MCU 1855. When the recharging related information is received, the MCU 1855 may control the communication module 1856 to transmit an advertisement signal that does not include charging completion information. In response thereto, a wireless power transmitter (not illustrated) may perform a subscription procedure or the like, and may transmit a charging function control signal that enables a charging function to the communication module 1856. When a charging function control signal that enables a charging function is received by the communication module 1856, the MCU 1855 may close the switch 1854 again whereby control is performed such that wireless power that is received and processed may be transferred to the charger 1861.

Figure 19:
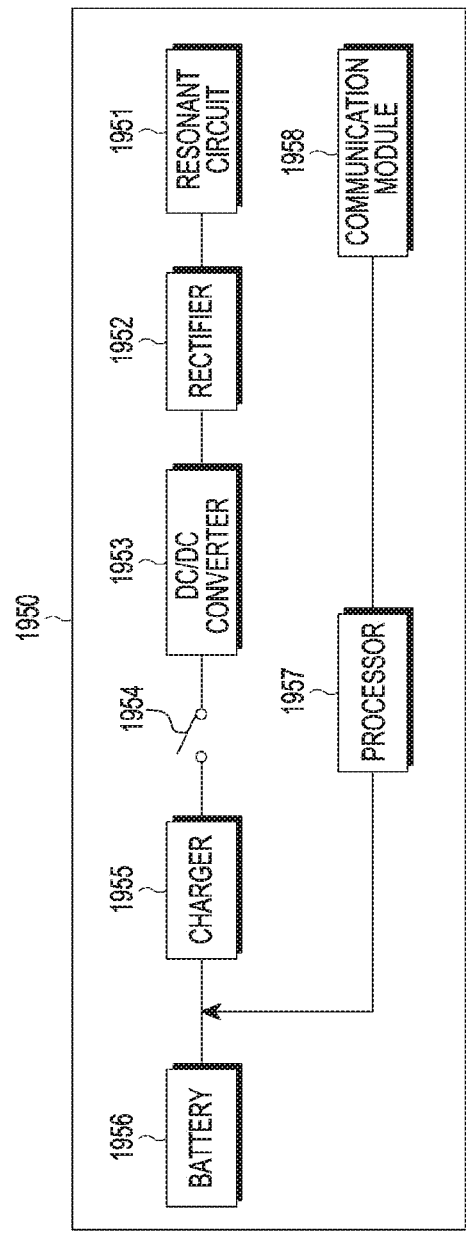
FIG. 19 is a block diagram of a wireless power receiver according to various embodiments of the present disclosure.

FIG. 19 is a block diagram of a wireless power receiver according to various embodiments of the present disclosure. In the embodiment of FIG. 19, a battery and wireless power receiver related hardware may be included in a single product, which is of an integrated type.

A resonant circuit 1951 may receive power from a wireless power transmitter (not illustrated), and a rectifier 1952 may rectify the received power and may output the rectified power. A DC/DC converter 1953 may convert the voltage of the rectified power. When a charging function control signal that enables a charging function is received by a communication module 1956, a processor 1967 may close a switch 1954. When a charging function control signal that disables the charging function is received by the communication module 1956, the processor 1957 may open the switch 1954.

The processor 1957 may monitor a battery 1956, and may detect a recharging condition. When the recharging condition is detected, the processor 1957 may control the communication module 1958 so as to transmit an advertisement signal that does not include charging completion information. In response thereto, a wireless power transmitter (not illustrated) may perform a subscription procedure or the like, and may transmit a charging function control signal that enables a charging function to the communication module 1958. When a charging function control signal that enables the charging function is received by the communication module 1958, the processor 1957 may close the switch 1954 again, whereby control is performed such that wireless power that is received and processed may be transferred to a charger 1955. The charger 1955 may charge the battery (1956).

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. A wireless power transmitter for charging a wireless power receiver, the wireless power transmitter comprising:
   resonant circuitry;
   communication circuitry; and
   a controller, wherein the controller is configured to:
   control the wireless power transmitter to output, through the resonant circuitry, first power for charging the wireless power receiver,
   receive, through the communication circuitry, a first signal indicating a complete charge from the wireless power receiver,
   in response to the receiving of the first signal, control the wireless power transmitter to stop outputting the first power and to output, through the resonant circuitry, a beacon power for detecting the wireless power receiver, after the outputting of the beacon power receive, through the communication circuitry from the wireless power receiver, a second signal including information which is, by the wireless power receiver, set based on identifying that charging is not required, and in response to the receiving of the second signal, maintain the outputting of the beacon power.

2. The wireless power transmitter of claim 1, wherein a Reboot or Charge status bit in a field of bit 4 of the second signal is set to "0" or "1".

3. The wireless power transmitter of claim 2, wherein the controller s configured to:

identify that the charging is required when it is identified that the Reboot or Charge status bit is "0", and identify that the charging is not required when it is identified that the Reboot or Charge status bit is "1".

4. The wireless power transmitter of claim 1, wherein the controller is configured to:

receive, through the communication circuitry from the wireless power receiver, a third signal including information indicating that the charging is required, and transmit, through the communication circuitry, a response signal in response to the receiving of the third signal.

5. The wireless power transmitter of claim 4, wherein the controller is configured to:

output, through the resonant circuitry, second power for driving communication circuitry of the wireless power receiver, in response to the outputting of the second power, receive, through the communication circuitry, a PRU static signal from the wireless power receiver, in response to the receiving of the PRU static signal, transmit, through the communication circuitry, a PTU static signal to the wireless power receiver, in response to the transmitting of the PTU static signal, receive, through the communication circuitry, a PRU dynamic signal from the wireless power receiver, in response to the receiving of the PRU dynamic signal, transmit, through the communication circuitry, a charging function control signal that enables a charging function to the wireless power receiver, and perform control so as to re-output, through the resonant circuitry, the first power.

6. The wireless power transmitter of claim 5, wherein charging function control signal comprises recharging information.

7. The wireless power transmitter of claim 1, wherein the controller is configured to transmit, through the communication circuitry, a charging function control signal that disables a charging function to the wireless power receiver.

8. A wireless power receiver for receiving power from a wireless power transmitter, the wireless power receiver comprising:

resonant circuity;
communication circuitry; and
a configured to:

receive, through the resonant circuitry from the wireless power transmitter, first power for charging the wireless power receiver, transmit, through the communication circuitry, a first signal indicating complete charge to the wireless power receiver, receive, through the communication circuitry, a charging function control signal that disables a charging function from the wireless power transmitter, disable the charging function based on receiving the charging function control signal, after disabling the charging function, identify that charging is not required, and transmit, through the communication circuitry, a second signal including information which is, by the wireless power receiver, set based on identifying that the charging is not required to the wireless power transmitter.

9. The wireless power receiver of claim 8, wherein a Reboot or Charge status bit in a field of bit 4 of the second signal is set to "0" or "1".

10. The wireless power receiver of claim 9, wherein the controller is configured to:

set the Reboot or Charge status bit to "0" when it is identified that charging is required by the wireless power receiver, and set the Reboot or Charge status bit to "1" when it is identified that charging is not required by the wireless power receiver.

11. The wireless power receiver of claim 8, wherein the controller is configured to:

when a recharging condition is detected, transmit, through the communication circuitry, a third signal including information indicating that the charging is required by the wireless power receiver, and receive, through the communication circuitry, a response signal (PRU response) in response to the transmitting of the third signal.

12. The wireless power receiver of claim 11, wherein the controller is configured to:

receive through the resonant circuitry, a second power for driving the communication circuitry, in response to the receiving of the second power, transmit, through the communication circuitry, a PRU static signal to the wireless power transmitter, in response to the transmitting of the PRU static signal, receive, through the communication circuitry, a PTU static signal from the wireless power transmitter, in response to the receiving of the PTU static signal, transmit, through the communication circuitry, a PRU dynamic signal to the wireless power transmitter, in response to the transmitting of the PRU dynamic signal, receive, through the communication circuitry, a charging function control signal that enables a charging function from the wireless power transmitter, and perform control so as to re-receive the first power.

13. The wireless power receiver of claim 12, wherein the charging function control signal comprises recharging information.

14. The wireless power receiver of claim 13, wherein the controller is configured to performs control so as not to output an indication for charging when it is identified that recharging information is included in the charging function control signal.

15. The wireless power receiver of claim 12, wherein the controller is configured to perform control so as not to output an indication for charging, while re-receiving the first power.

* * * * *